(12) United States Patent
Lathrop et al.

(10) Patent No.: US 8,675,236 B2
(45) Date of Patent: Mar. 18, 2014

(54) IMAGE PROCESSING METHOD

(75) Inventors: George E. Lathrop, Dansville, NY (US); Bruce A. Link, Rochester, NY (US); Joseph J. Furno, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 79 days.

(21) Appl. No.: 13/363,048

(22) Filed: Jan. 31, 2012

(65) Prior Publication Data

US 2013/0194620 A1    Aug. 1, 2013

(51) Int. Cl.
*G06F 15/00* (2006.01)

(52) U.S. Cl.
USPC .................................................. 358/1.15

(58) Field of Classification Search
USPC .......................................................... 358/1.15
See application file for complete search history.

(56) References Cited

U.S. PATENT DOCUMENTS

| 7,353,998 B2* | 4/2008 | Bechtel et al. | 235/462.15 |
| 2008/0079985 A1* | 4/2008 | Ferlitsch | 358/1.15 |

* cited by examiner

*Primary Examiner* — Saeid Ebrahimi Dehkordy
(74) *Attorney, Agent, or Firm* — Eugene I. Shkurko; Amit Singhal

(57) ABSTRACT

A method comprising receiving digital image data from a plurality of digital image sources, which contains digital images and source identifiers. A plurality of processors are provided for simultaneously processing the digital images according to stored processing instructions which correspond to the source identifiers.

15 Claims, 21 Drawing Sheets

| | SCANNER #1 | SCANNER #2 | SCANNER #3 |
|---|---|---|---|
| SCANNER ID | SCANNER_X | SCANNER_Y | SCANNER_Z |
| SCANNER RECOGNITION DATA | SCANNER #1 RECOGNITION DATA | SCANNER #2 RECOGNITION DATA | SCANNER #3 RECOGNITION DATA |
| IMAGE ADJUSTMENT PREFERENCES | SCANNER #1 ADJUSTMENT PREFS | SCANNER #2 ADJUSTMENT PREFS | SCANNER #3 ADJUSTMENT PREFS |
| IMAGE STREAM PREFERENCES | SCANNER #1 IMAGE STREAM PREFS | SCANNER #2 IMAGE STREAM PREFS | SCANNER #3 IMAGE STREAM PREFS |
| IMAGE FORMAT PREFERENCES | SCANNER #1 IMAGE FORMAT PREFS | SCANNER #2 IMAGE FORMAT PREFS | SCANNER #3 IMAGE FORMAT PREFS |
| STORAGE PREFERENCES | SCANNER #1 STORAGE PREFS | SCANNER #2 STORAGE PREFS | SCANNER #3 STORAGE PREFS |

FIG. 9

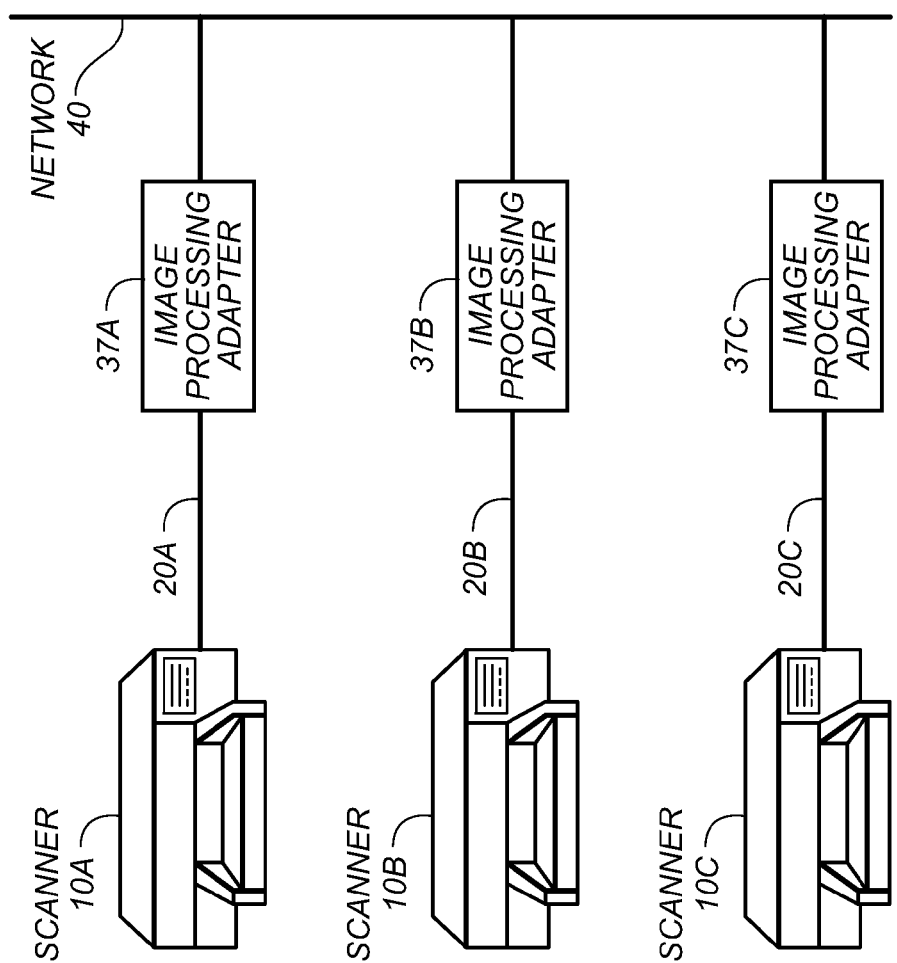

IMAGE PROCESSING METHOD

CROSS-REFERENCE TO RELATED APPLICATIONS

U.S. patent application Ser. No. 13/362,226, entitled "Image Scanning and Processing System"; Ser. No. 13/362,419 entitled "Image Processing Unit for Supporting Multiple Scanners"; Ser. No. 13/362,129 entitled "Processing Images from Multiple Scanners"; Ser. No. 13/362,938 entitled "Image Processing Method for Supporting Multiple Scanners"; Ser. No. 13/362,828 entitled "Method of Image Processing from Multiple Scanners"; Ser. No. 13/362,272 entitled "Image Processing Adapter and Method"; Ser. No. 13/362,180 entitled "Image Processing Management"; and Ser. No. 13/362,614 entitled "Image Processing Management Method," all filed concurrently herewith are assigned to the same assignee hereof, Eastman Kodak Company of Rochester, N.Y., and contain subject matter related, in certain respect, to the subject matter of the present application. The above-identified patent applications are incorporated herein by reference in their entirety.

Reference is made to commonly-assigned, co-pending U.S. Patent Application 2011/0270947 A1, filed Apr. 29, 2010, entitled "Digital Imaging Method Employing User Personalization and Image Utilization Profiles," the disclosure of which is incorporated herein by reference in its entirety.

FIELD OF THE INVENTION

This invention pertains to the field of image processing, and more particularly to image processing for image data provided by multiple digital image sources.

BACKGROUND OF THE INVENTION

Document scanners are used to convert paper documents into electronic records. Documents scanners often include digital image processing in order to enhance images captured by the document scanner to improve the image quality and to extract information contained within the document. The improved image quality that results from the image processing allows more accurate downstream information extraction such as used in OCR processing, and clearer images when the processed digital images are printed. In many high volume document scanners, the image processing is implemented by embedding the image processing hardware and software into the scanner. For example, the Kodak model i5200 scanner includes embedded image processing to implement functions such as automatic color detection, autocrop, deskew, content-based blank page detection, multi-color dropout, and compression.

FIG. 2A represents an example of a prior art document scanner, connected to a PC, which includes embedded image processing hardware. In this example, document to be imaged 260 is captured by a camera 261 which converts the document into digital image data that is stored in buffer memory 262. The scanner performs pixel processing 263 to correct for any abnormal pixel information (i.e., correcting for illumination roll-off or dead CCD pixels, defect concealment and color correction) introduced by the scanner or camera before storing the pixel processed digital image data in image buffer 264. The image data stored in image buffer 264 is then analyzed and processed again by the image processing 265 before being sent to the network interface of the scanner 266. Typical image processing function performed by image processing 265 may include, for example, deskew, rotation, color-dropout, binarization and compression. Typically a PC 20 is attached to the scanner to capture the processed image output from the scanner 10 and to perform downstream processing as described above.

In some document scanners, in order to reduce cost, much of the image processing is performed by a generic PC attached to the scanner, rather than by hardware within the scanner. The PC then performs the image processing. For example, the Kodak model i1200 series scanner is an example of a low cost document scanner that requires a PC to perform the document image processing.

In some applications, there is a need for multiple scanners in the same facility. For example, a bank office typically has multiple bank tellers, and each bank teller can have a scanner at their work area. FIG. 2B shows an example of a prior art document scanning and processing system which could be used in such applications. The system includes three document scanners 10A, 10B, and 10C which connect to three personal computers 30A, 30B, and 30C over three different interfaces 20A, 20B, and 20C. The personal computers 30A, 30B, and 30C provide image processing for the corresponding scanner, and provide processed images over a network 40.

As requirements for faster scanning and more complex image processing is added to the scanner system, the performance and cost of the embedded hardware (and/or PC attached to the scanner) increases. As the costs of the scanner and PC increase, it becomes less attractive to the end user to purchase the scanner system as the cost payback period becomes longer. Even though a higher performance PC is required to support the full rated scanner throughput, many of these lower cost scanners are in venues having a lower daily throughput. Thus, they are not continuously scanning documents and the processing power in the higher performance PC goes un-utilized during these low scanning utilization periods.

In an alternate embodiment, a system described in commonly-assigned U.S. Pat. No. 7,353,998 B2, entitled "Image Processing System Receiving Simultaneous Scan requests From Multiple Scanners", allows multiple scanners to be connected to a single central PC computer. This patent is incorporated by reference herein in its entirety. This prior art system suffers from being the bottleneck for the scanning process. In this system, the scanner has to first make a request to scan a document before it actually performs the scan. This creates latency where the scanner must wait for the resources to be allocated to the scanner. The scanner is a slave to the PC, which pulls the data instead of allowing the scanner to push the data at its rated speed. In addition, as the number of scanners and needed image processing increases, the cost of the central PC can increase dramatically.

In addition, some countries or markets (and businesses in general) cannot afford to purchase the latest high performance PC to attach to the scanner(s), thereby prohibiting the sale of costly scanner systems into these markets.

Thus, there remains a need to provide a low cost, high performance system providing scanner image processing in applications where multiple scanners are required.

SUMMARY OF THE INVENTION

A preferred embodiment of the present invention is a method comprising receiving digital image data from a plurality of digital image sources, which contains digital images and source identifiers. Each of the source identifiers corresponds to one of the digital images. A plurality of processors are provided for simultaneously processing the digital images according to stored processing instructions which correspond to the digital images. The processing instructions are identified according to a source identifier associated with each digital image. The processed digital images are sequentially output.

Another preferred embodiment of the present invention is a method comprising receiving digital image data from a plurality of digital image sources comprising a plurality of digital images. Processing preferences are determined for each of the digital images. A plurality of processors simultaneously process the digital images according to stored processing procedures corresponding to the digital images. The processing procedures are optimized for different ones of the processors. Each of the digital images are simultaneously processed according to their corresponding processing procedures by the processors. The processed digital images are sequentially output.

Other embodiments that are contemplated by the present invention include tangible, non-transitory computer program products, readable storage media, computer readable media, and program storage devices tangibly embodying or carrying a program of instructions, or storing computer programs, readable by machine or a processor, for having the machine or computer processor execute instructions or data structures stored thereon. Such tangible, non-transitory computer readable media can be any available media that can be accessed by a general purpose or special purpose computer. Such computer-readable media can comprise physical computer-readable media such as RAM, ROM, EEPROM, and other solid state electronic storage devices, and CD-ROM, DVD, or other optical storage media such as optical disk storage, optical tape, machine readable bar codes, or magnetic storage media such as magnetic disk storage (such as a floppy disk), magnetic tape, or other magnetic storage devices, for example. Any other media or physical device that can be used to carry or store software programs which can be accessed by a general purpose or special purpose computer are considered within the scope of the present invention.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. It is to be understood that the attached drawings are for purposes of illustrating the concepts of the invention. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

FIG. 9 is a diagram illustrating a scanner identification database.

FIG. 14A is a block diagram of image processing adapters connected over a network in accordance with an embodiment of the invention;

DETAILED DESCRIPTION OF THE INVENTION

Figure 1A:
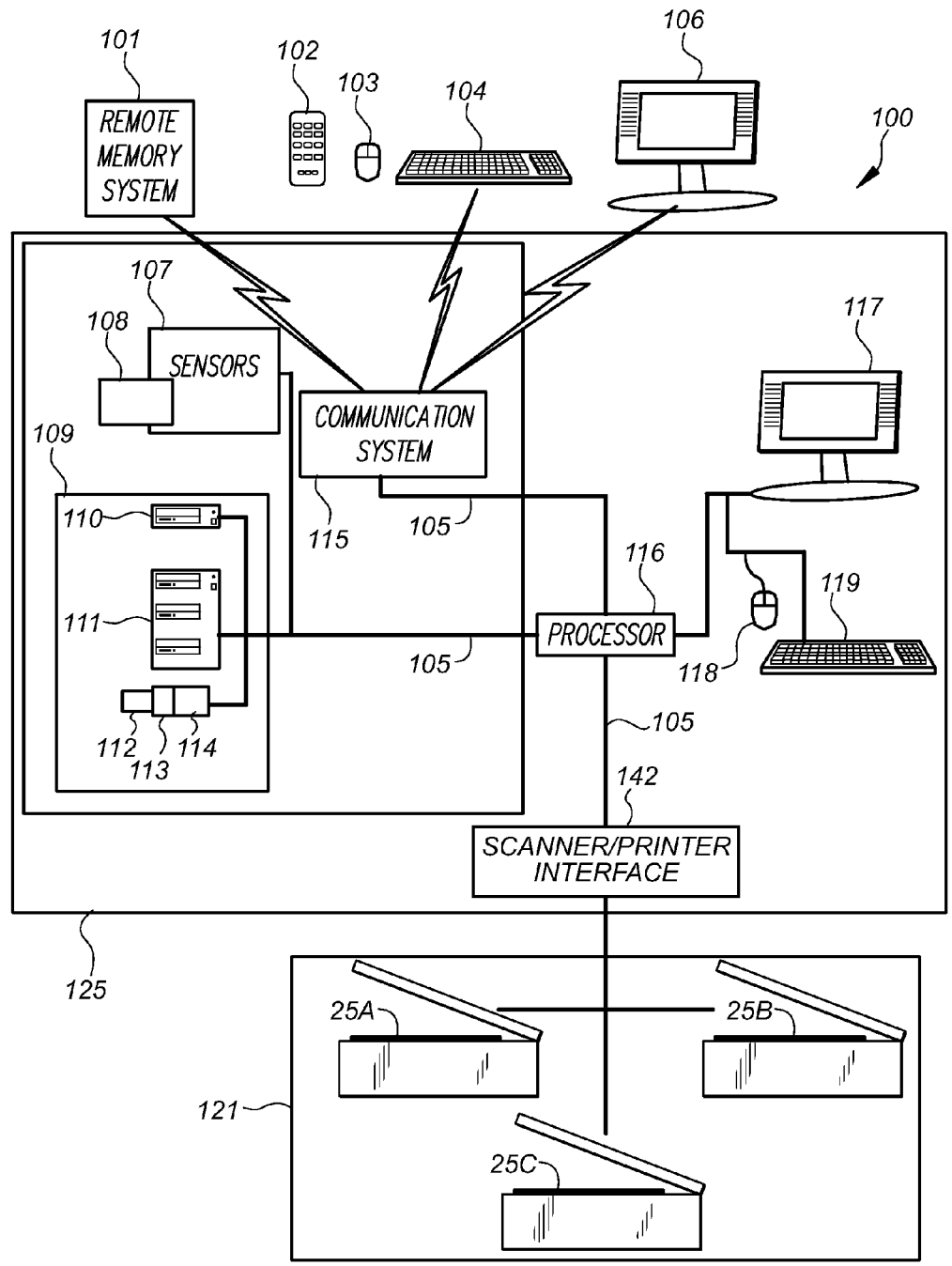
FIGS. 1A-B illustrate computer system embodiments useful for practicing preferred embodiments of the present invention.

In the following description, some preferred embodiments of the present invention will be described in method terms that would ordinarily be implemented as a software program. Those skilled in the art will readily recognize that the equivalent of such software can also be constructed in hardware. Thus, other preferred embodiments of the present invention will be described in terms that would ordinarily be implemented as an image processing system. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because document scanners and circuitry for image processing are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

FIG. 1A illustrates in a generic schematic format a computing system for implementing preferred embodiments of the present invention. Electronic apparatus and processing system 100 is used, as described in examples herein, for processing received digital images received from any of a plurality of image sources. In a preferred embodiment as illustrated in FIG. 1A, electronic computing system 100 comprises a housing 125 and local memory or storage containing data files 109, optional remote user input devices 102-104, local user input devices 118-119, an optional remote output system 106, and a local output system 117, wherein all electronics are either hardwired to processor system 116 or optionally connected wirelessly thereto via Wi-Fi or cellular through communication system 115. Output systems 106 and 117 depict display screens and audio speakers. The computer system 100 may include specialized graphics subsystem to drive output display 106, 117. The output display may include a CRT display, LCD, LED, or other forms. The connection between communication system 115 and the remote I/O devices is also intended to represent local network and internet (network) connections to processing system 116. Optional remote memory system 101 represents network accessible storage. Remote and local storage (or memory) illustrated in FIG. 1A can be used as necessary for storing computer programs and data sufficient for image processing system 116 to execute the algorithms for image processing disclosed herein. Data systems 109, user input systems 102-104 and 118-119 or output systems 106 and 117, and processor system 116 can be located within housing 125 or, in other preferred embodiments, can be individually located in whole or in part outside of housing 125.

Data systems 109 can include any form of electronic or other circuit or system that can supply digital data to processor system 116 from which the processor can derive digital images for use in the image processing steps described herein. In this regard, the data files delivered from systems 109 can comprise, for example and without limitation, programs, still images, image sequences, video, graphics, multimedia, and other digital image programs. In a preferred embodiment of FIG. 1A, sources of data files also include those provided by sensor devices 107, data received from communication system 115, and various detachable or internal memory and storage devices coupled to processing system 116 via systems 109.

Sensors 107 are optional and can include light sensors, audio sensors, image capture devices, biometric sensors and other sensors known in the art that can be used to detect and record conditions in the environment of system 100 and to convert this information into a digital form for use by processor system 116. Sensors 107 can also include one or more sensors 108 that are adapted to capture digital still or video images.

Storage/Memory systems 109 can include conventional memory devices such as solid state, magnetic, HDD, optical or other data storage devices, and circuitry for reading removable or fixed storage media. Storage/Memory systems 109 can be fixed within system 100 or can be removable, such as HDDs and floppy disk drives. In the embodiment of FIG. 1A, system 100 is illustrated as having a hard disk drive (HDD) 110, disk drives 111 for removable disks such as an optical, magnetic or specialized disk drives, and a slot 114 for portable removable memory devices 112 such as a removable memory card, USB thumb drive, or other portable memory devices, including those which may be included internal to a camera or other handheld device, which may or may not have a removable memory interface 113 for communicating through memory slot 114. Although not illustrated as such, memory interface 113 also represents a wire for connecting memory devices 112 to slot 114. Data including, but not limited to, control programs, digital images, application programs, metadata, still images, image sequences, video, graphics, multimedia, and computer generated images can also be stored in a remote memory system 101, as well as locally, such as in a personal computer, network server, computer network or other digital system such as a cloud computing system. Remote system 101 is shown coupled to processor system 116 wirelessly, however, such systems can also be coupled over a wired network connection or a mixture of both.

In the embodiment shown in FIG. 1A, system 100 includes a communication system 115 that in this embodiment can be used to communicate with an optional remote memory system 101, an optional remote display 106, and/or optional remote inputs 102-104. A remote input station including remote display 106 and/or remote input controls 102-104 communicates with communication system 115 wirelessly, as illustrated, or can communicate as a wired network. Local input station including either or both a local display system 117 and local inputs can be connected to processor system 116 using a wired (illustrated) or wireless connection such as Wi-Fi or infra red transmission.

Communication system 115 can comprise for example, one or more optical, radio frequency or other transducer circuits or other systems that convert image and other data into a form that can be conveyed to a remote device such as remote memory system 101 or remote display device 106 configured with digital receiving apparatus, using an optical signal, radio frequency signal or other form of signal. Communication system 115 can also be used to receive a digital image and other digital data from a host or server computer or network (not shown) or a remote memory system 101. Communication system 115 provides processor system 116 with information and instructions from corresponding signals received thereby. Typically, communication system 115 will be adapted to communicate with the remote memory system 101, or output system 106 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input systems provide a way for a user of system 100 to provide instructions, or selections via a customized user interface, to processor system 116. This allows such a user to make a designation of data files to be used in processing digital images as described herein. User input system 102-104 and 118-119 can also be used for a variety of other purposes including, but not limited to, allowing a user to arrange, organize and edit content of digital image files, to provide information about the user such as user names, to provide annotation data to identify and tag digital image data files, to enter metadata not otherwise extractable by the computing system, and to perform such other interactions with system 100 as will be described herein.

In this regard user input systems 102-104 and 118-119 can comprise any form of transducer or other device capable of receiving an input from a user and converting this input into a form interpreted by processor system 116. For example, user input system can comprise a touch screen input at 106 and 117, a touch pad input, a 4-way switch, a 6-way switch, an 8-way switch, a stylus system, a trackball system or mouse such as at 103 and 118, a joystick system, a voice recognition system such as at 108, a gesture recognition system such as at 107, a keyboard, a remote control 102, cursor direction keys, on screen keyboards, or other such systems. In the embodiment shown in FIG. 1A, remote input system can take a variety of forms, including, but not limited to, a remote keyboard 104, a remote mouse 103, and a remote control 102. Local input system includes local keyboard 119, a local mouse 118, microphone 108, and other sensors 107, as described above.

Additional input or output systems 121 are used for rendering images, scanning/printing images, scanning/printing text, or other graphical representations in a manner that allows an image to be captured and converted as necessary for use by the computing system. In this regard, input or output systems 121 can comprise a plurality of images sources, including any conventional structure or source that is known for providing digital images, including, but not limited to, scanners 25A-25C (which can also include multifunction devices such as scanner/printer/fax, and other functions).

In certain embodiments, the source of data files 109, user input systems 102-104 and output systems 106, 117, and 121 can share components. Processor system 116 operates system 100 based upon signals from user input system 102-104 and 118-119, sensors 107-108, storage/memory 109 and communication system 115. Processor system 116 can include, but is not limited to, a programmable digital computer, a programmable microprocessor, a programmable logic processor, multi-processing systems, a chipset, a series of electronic circuits, a series of electronic circuits reduced to the form of an integrated circuit, or a series of discrete components on a printed circuit board. As described herein, processor system 116 can also include a custom multi-processor system for handling high throughput digital image data provided by multiple image sources 121.

As will be described below, processing system 100 can be configured as a workstation, laptop, kiosk, PC, or other similar systems. As an exemplary workstation, the computer system central processing unit 116 communicates over an interconnect bus 105. The CPU 116 may contain a single microprocessor, or may contain a plurality of microprocessors for configuring the computer system 100 as a multi-processor system, and high speed cache memory comprising several levels. The memory system 109 may include a main memory, a read only memory, mass storage devices such as tape drives, or any combination thereof. The main memory typically includes system dynamic random access memory (DRAM). In operation, the main memory stores at least portions of instructions for executions by the CPU 116. For a workstation, for example, at least one mass storage system 110 in the form of an HDD or tape drive, stores the operating system and application software for executing processing steps as described herein. Mass storage 110 within computer system 100 may also include one or more drives 111 for various portable media, such as a floppy disk, a compact disc read only memory (CD-ROM or DVD-ROM), or an integrated circuit non-volatile memory adapter 114 (i.e. PC-MCIA adapter) to provide and receive instructions and data to and from computer system 100.

Computer system 100 also includes one or more input/output interfaces 142 for communications, shown by way of example as an interface for data communications to scanners 25A-25C. The interface may be a USB port, a modem, an Ethernet card or any other communication protocol appropriate for data communication. The physical communication links may be optical, wired, or wireless. If used for scanning, the communications enable the computer system 100 to receive scans from a scanners 25A-25C.

As used herein, terms such as computer or "machine readable medium" refer to any non-transitory medium that stores or participates, or both, in providing instructions to a processor for execution. Such a medium may take many forms, including but not limited to, non-volatile media and volatile media. Non-volatile media include, for example, optical or magnetic disks, flash drives, and such as any of the storage devices in any computer(s) operating as one of the server platforms, discussed above. Volatile media include dynamic memory, such as main memory of such a computer platform. Transitory physical transmission media include coaxial cables; copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during radio frequency (RF) and infrared (IR) data communications. Common forms of non-transitory computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

Figure 1B:
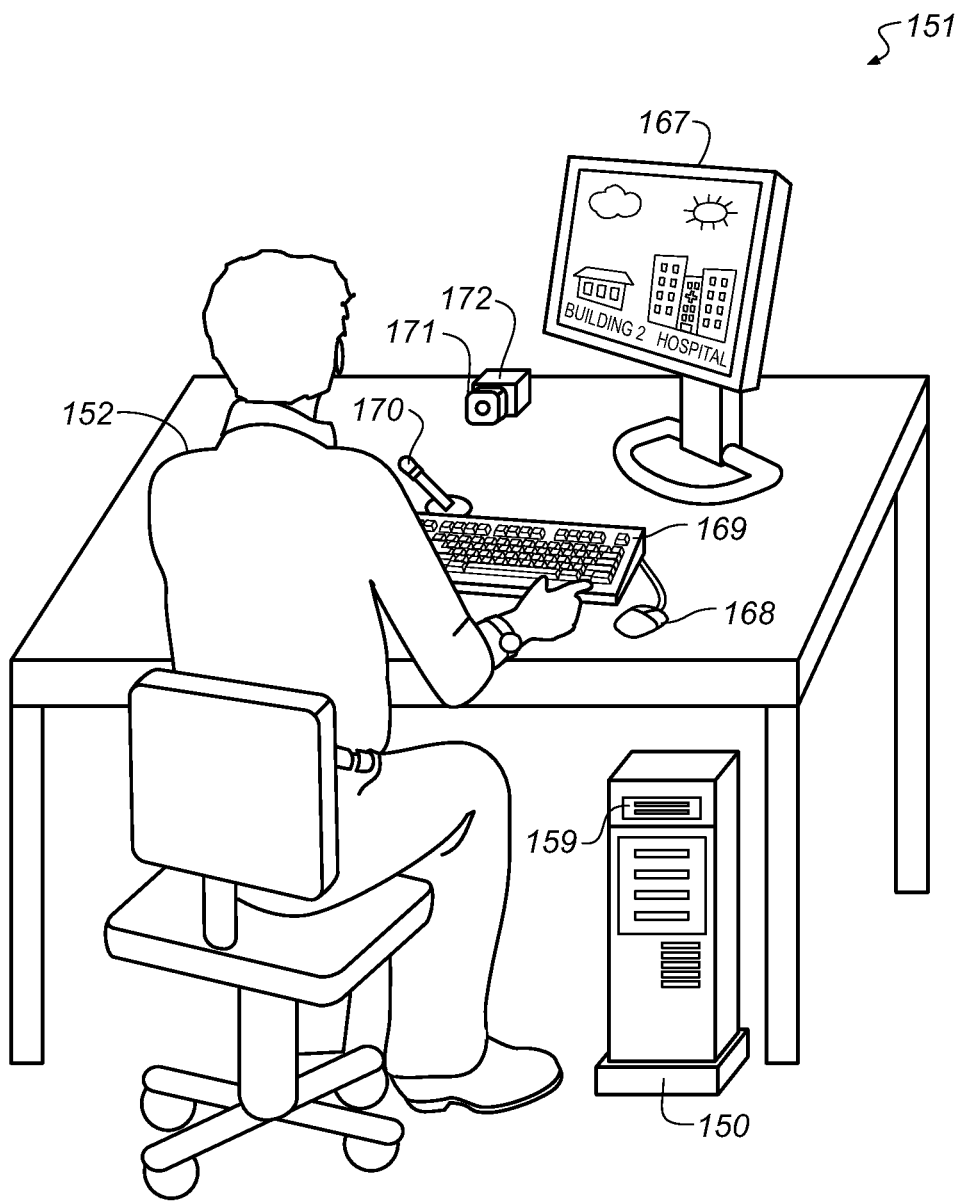

As is illustrated in FIG. 1B, an example implementation of the processing system just described is embodied as example PC or workstation 150 and connected components as follows. Processing system 150 and local user input system 168-172 can take the form of an editing studio 151 (hereafter also referred to as an "editing area"), although this illustration is not intended to limit the possibilities as described in FIG. 1B of potential implementations. Local storage or memory 159 can take various forms as described above with regard to data systems 109. In this illustration, a user 152 is seated before a console comprising local keyboard 169 and mouse 168 and a local display 167 which is capable, for example, of displaying multimedia and digital image content. As is also illustrated in FIG. 1B, the editing area can also have sensors 170-172 including, but not limited to, audio sensors 170, camera or video sensors 172, with built in lenses 171. Display 167 can be used as a presentation system for presenting final processed digital images or as works-in-progress. It can present output content to an audience, such as user 152. It will be appreciated that the material presented to an audience can also be presented to remote viewers.

Figure 3A:
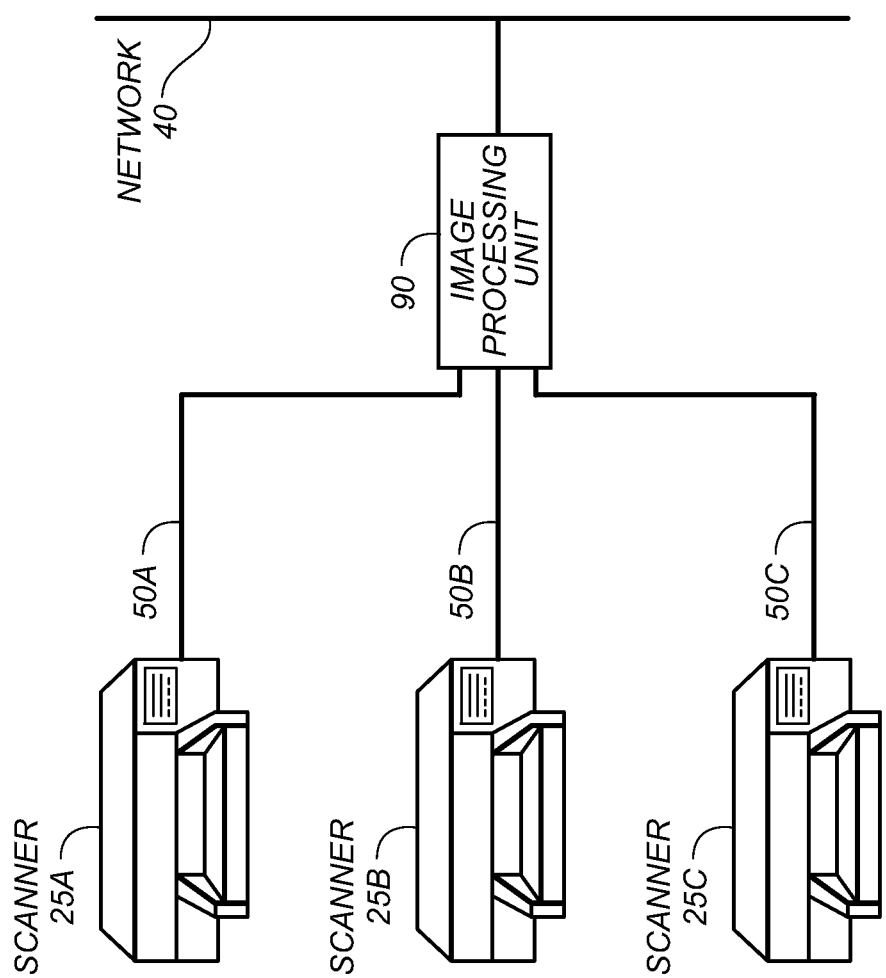
FIG. 3A is a block diagram of a document scanning and processing system in accordance with an embodiment of the invention.
Figure 3B:
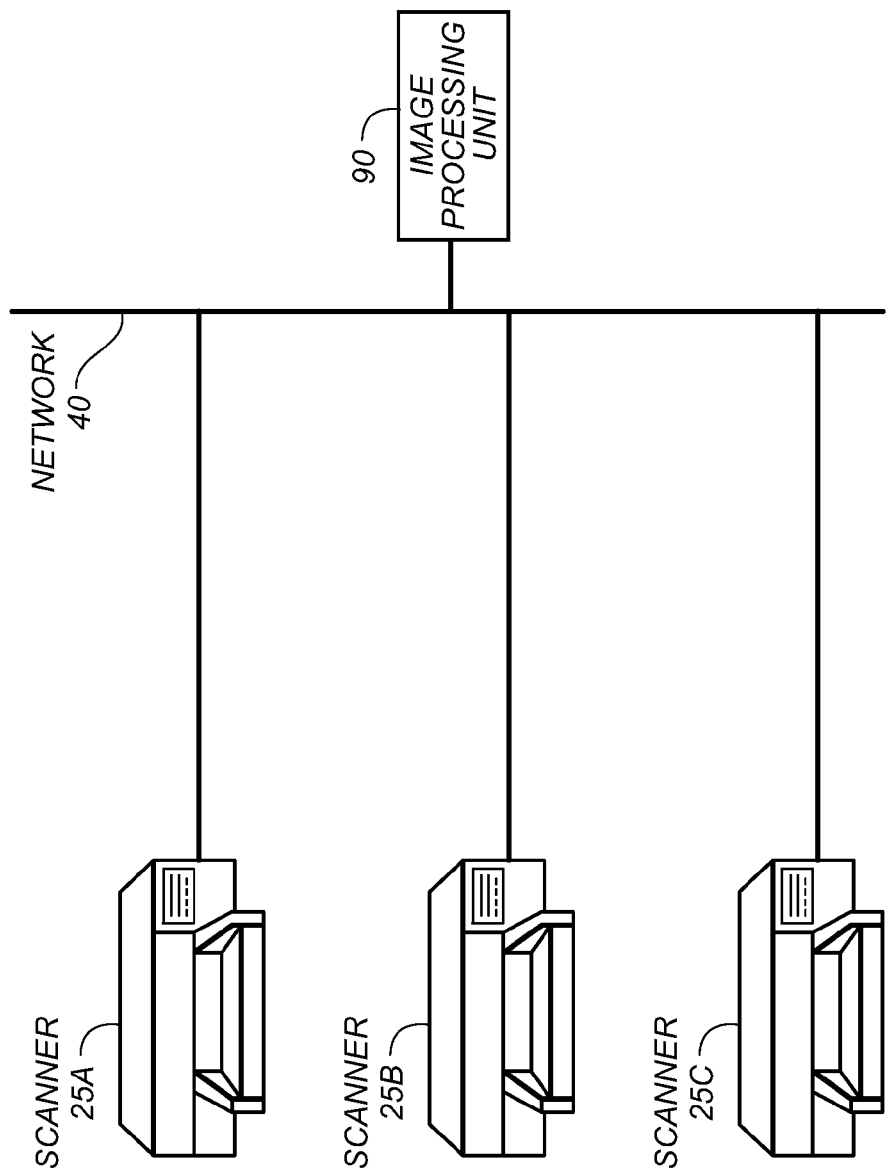
FIG. 3B is a block diagram of an alternative document scanning and processing system in accordance with an embodiment of the invention.

FIGS. 3A and 3B depicts block diagrams of two embodiments of a document scanning and processing system according to the present invention. The systems and methods to be described herein provide a cost effective solution for processing image data provided from multiple scanners, by eliminating the need for a dedicated PC attached to each scanner and moving the image processing to a central location where this resource can be shared among multiple scanners. A shared processing resource provides a cost benefit by eliminating the high cost of having a dedicated PC attached to each scanner to perform the image processing and scan control. In addition, by using dedicated hardware that is specific to the image processing, a lower cost, lower power system can be constructed than using a generic PC or server.

As shown in FIG. 3A, the document scanners 25A, 25B and 25C are connected directly to the image processing unit 90, over three different interfaces 50A, 50B, and 50C, which then processes the scanned images. The image processing unit 90 is also connected to a network 40 and can send the processed images to a document repository and/or send the captured image information to other applications. For example, an image for a billing invoice can be sent to a document repository while the billing information, such as customer name, date, invoice number, amount, can be sent to a billing application. As shown in an alternative system in FIG. 3B, the document scanners 25A, 25B and 25C are connected directly to the network 40. The images captured by document scanners 25A, 25B and 25C are sent over the network 40 to image processing unit 90 which then can process the images similar to the system shown in FIG. 3A.

Figure 4:
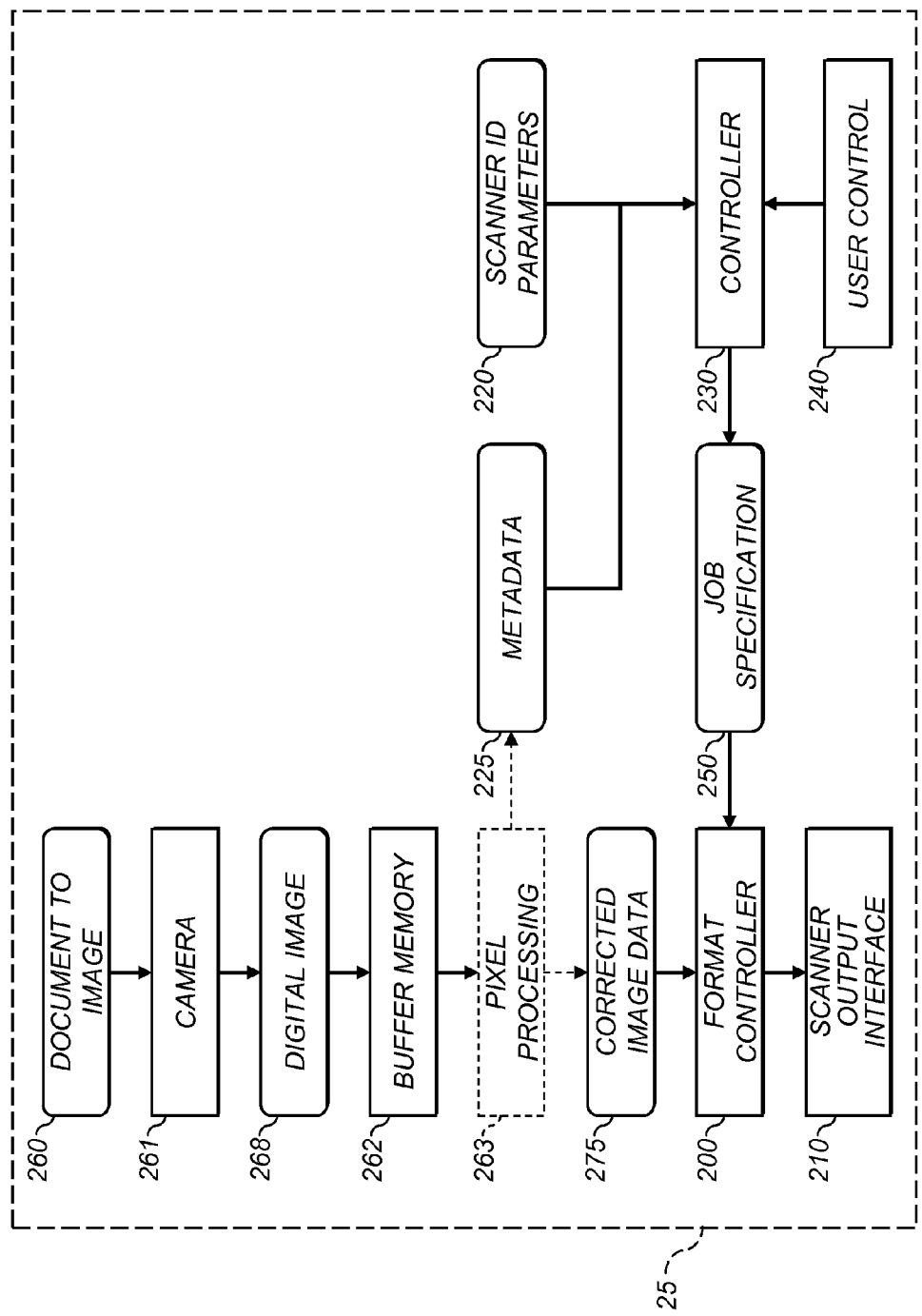
FIG. 4 is a flow diagram depicting a document scanning and processing system in accordance with an embodiment of the invention.

FIG. 4 is a flow diagram depicting image processing operations that could be used to process digital images captured by a document scanning system as described herein. Processing parameters used by image processing unit 90 to manipulate the captured image data for a particular digital document image are obtained by various settings from the user control at step 240, applied by the system, and then output over scanner output interface at step 210. User controls 240 can be input from hand held smart devices and be merged into the job specification 250. The scanner receives a document to be imaged at step 260, which can be a text document, photograph or some combination thereof. A camera focuses light reflected from the document at step 261 onto the camera's image sensor (not shown), for example, a single-chip color CCD, CMOS image sensor or contact image sensor (CIS), and an Analog-to-Digital (A/D) converter, to produce a digital document image at step 268. The digital image is then temporarily stored in buffer memory at step 262. The image data stored in buffer memory 262 can be subsequently manipulated by an optional pixel processing at step 263, as explained above, using embedded software programs (firmware) or dedicated hardware. The pixel processing 263 can be performed to correct for pixel-to-pixel variation and anomalies, such as illumination roll-off, dead image sensor pixels, which are generated by the camera, for example, in step 261. As part of the pixel processing 263, information (e.g.: colorfulness of pixels, sharpness, histograms) about the digital image 268 may be extracted and captured as metadata 225. This metadata 225 could consist of information that could be used to aid in the identification of the scanner and/or processing the digital image 268. The output of the pixel processing is sent to a format converter at step 200 which prepares the image data to be sent to the image processing unit 90.

At this point, user controls are read at step 240 to set and implement scanner operators' processing preferences. The scanner operator can define how the document should be processed, which can also be programmed to override any system settings defined in the scanner profile database (FIG. 9). The input user controls could consist of, but not limited to, the requested output resolution, rotation, pixel bit depth (24-bit color, 8-bit grayscale, bitonal), user color preferences, file format, compression, and document type. The user control 240 will include this information and any user preferences to be carried out on the associated image during image processing along with a plurality of associated image streams requested. Default settings can also be stored and implemented in the absence of specific inputs from the scanner operator.

A user interface receives user preferences that are then input into the job specification 250 that define how the image is to be processed according to the user's preferences. User controls typically include some combination of buttons, rocker switches, joysticks, or rotary dials. In some embodiments, user controls are input by touch screen graphical user interface displayed on an image display. In other embodiments, the user controls can include a means to receive input from the user or an external device via a tethered, wireless, voice activated, visual or other interface. Other types of status displays or images displays can be used.

Controller 230 reads the scanner ID parameters 220, the metadata 225 and the user control 240 to create the job specification 250 that is sent to format converter 200. The scanner ID parameters 220 could consists of, but not limited to, scanner ID, scan sequence count, front/rear capture, unique scanner characteristics such as the manufacturer, model, serial number, maximum camera capture resolution, pixel bit depth (24-bit color, 8-bit grayscale). The job specification 250 contains the information regarding what scanner the image came from and defines image processing preferences. After the controller 230 gathers this information into the job specification 250, the format controller combines the corrected image data from step 275 and the job specification 250 which is then dispatched over the scanner output interface 210. The scanner output interface 210 can conform to, for example, the well-known USB interface specification, or other well-known interfaces such as PCI, Firewire, PCI Express, Ethernet or various wireless interface protocols, such as a Bluetooth wireless interface or a 802.11 wireless interface.

There are a variety of different methods the format controller could use to combine the corrected image data 275 and the job specification 250. In the preferred embodiment, the format controller overlays the first (or last) N number of pixels within each raster line of the image with the job specification 250. Typically the raster from a CCD or CMOS image sensor has a larger field-of-view than a widest document to be scanned. These extra pixels can be replaced with the job specification 250. Depending upon the size of the job specification 250, the job specification 250 may span several raster lines within the image. Control signals or control markers within the data stream can be used to mark the exact location of the job specification 250 within the image. In an alternative embodiment, job specification 250 could be appended to the beginning or end of the raster line if there were no extra pixels as in the case of a CIS. An alternative method would be to send separate packets of job specification 250 data between each raster line or every X number of rasters. In yet another alternative method the job specification 250 data could be simply appended to the end of the pixel image data corrected at step 275.

The document scanner 25 outputs data in the form of capture image 961 (FIG. 10) via the scanner output interface 210, which is connected to the image processing unit 90. The capture job is composed of capture image 961 (previously known as pixel corrected image data 275 in FIG. 4 and the job specification 250 which includes the metadata 225, scanner ID parameters 220 and user preferences from the user control 240.

Figure 5:
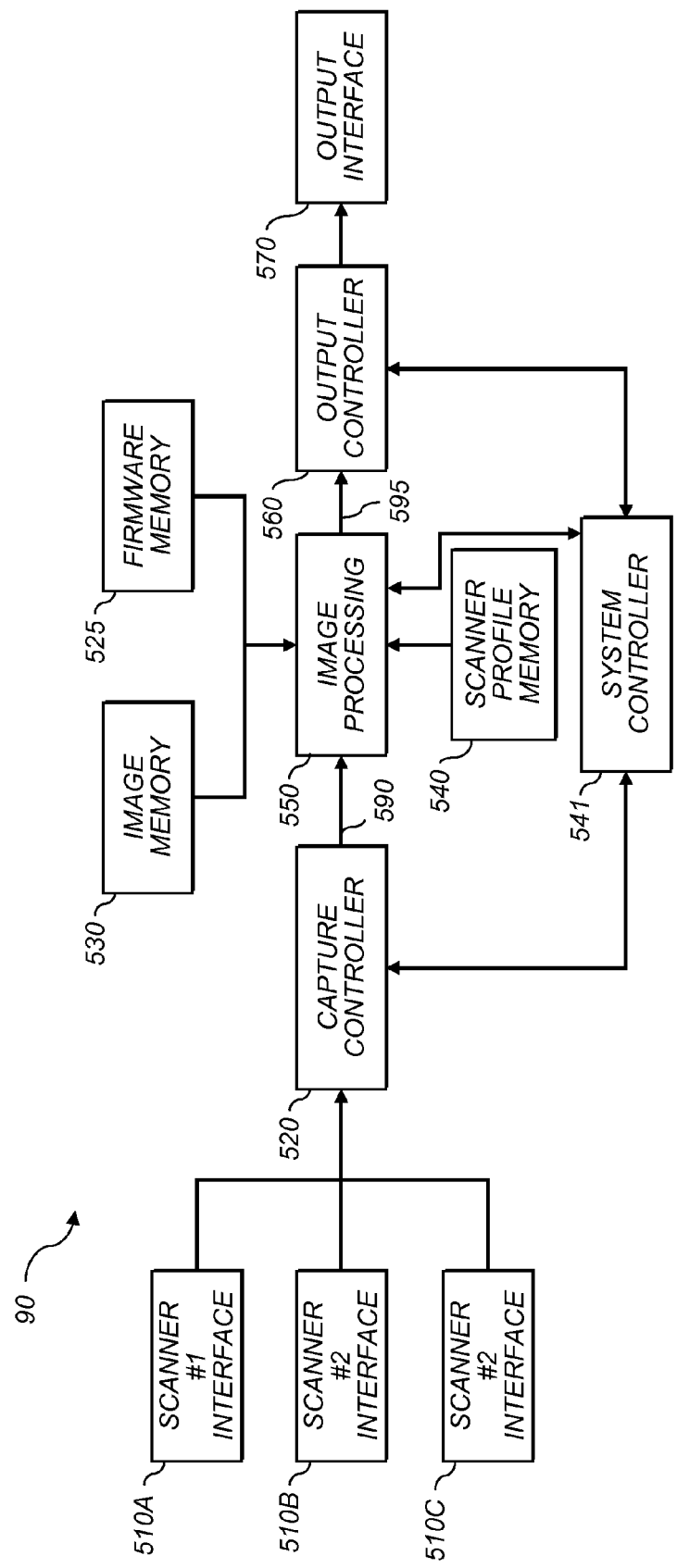
FIG. 5 is a block diagram depicting an image processing system in accordance with an embodiment of the invention.

FIG. 5 depicts a preferred embodiment of an image processing unit 90. The document scanners 25A, 25B and 25C (see FIGS. 3A-B) are connected to the image processing unit 90 through scanner interface 510A, 510B and 510C, respectively. The scanner interface 510A, 510B and 510C can conform to, for example, the well-known USB interface specification, or other interfaces such as Camera Link, PCI Express, GigE Vision, and Ethernet. The image data from the scanner interfaces 510A, 510B and 510C are temporarily stored in capture buffer of the capture controller 520, where it is subsequently manipulated by image processing 550. The image processing 550 will use the metadata within job specification 250 attached to the digital data capture job 960 to determine which scanner captured the digital image.

It will be understood that the functions of image processing 550 can be provided using a single programmable processor or by using multiple programmable processors, including one or more digital signal processor (DSP) devices. Alternatively, the image processing 550 can be provided by custom circuitry (e.g., by one or more custom integrated circuits (ICs) designed specifically for use in digital document scanners), or by a combination of programmable processor(s) and custom circuits. It will be understood that connections between the image processing 550 and some or all of the various components shown in FIG. 5 can be made using a standard or custom bus interface. For example, in some embodiments the connection between the capture controller 520 and image processing 550 or between image processing 550 and output controller 560 can be made using a standard parallel or serial bus interface.

Figure 10:
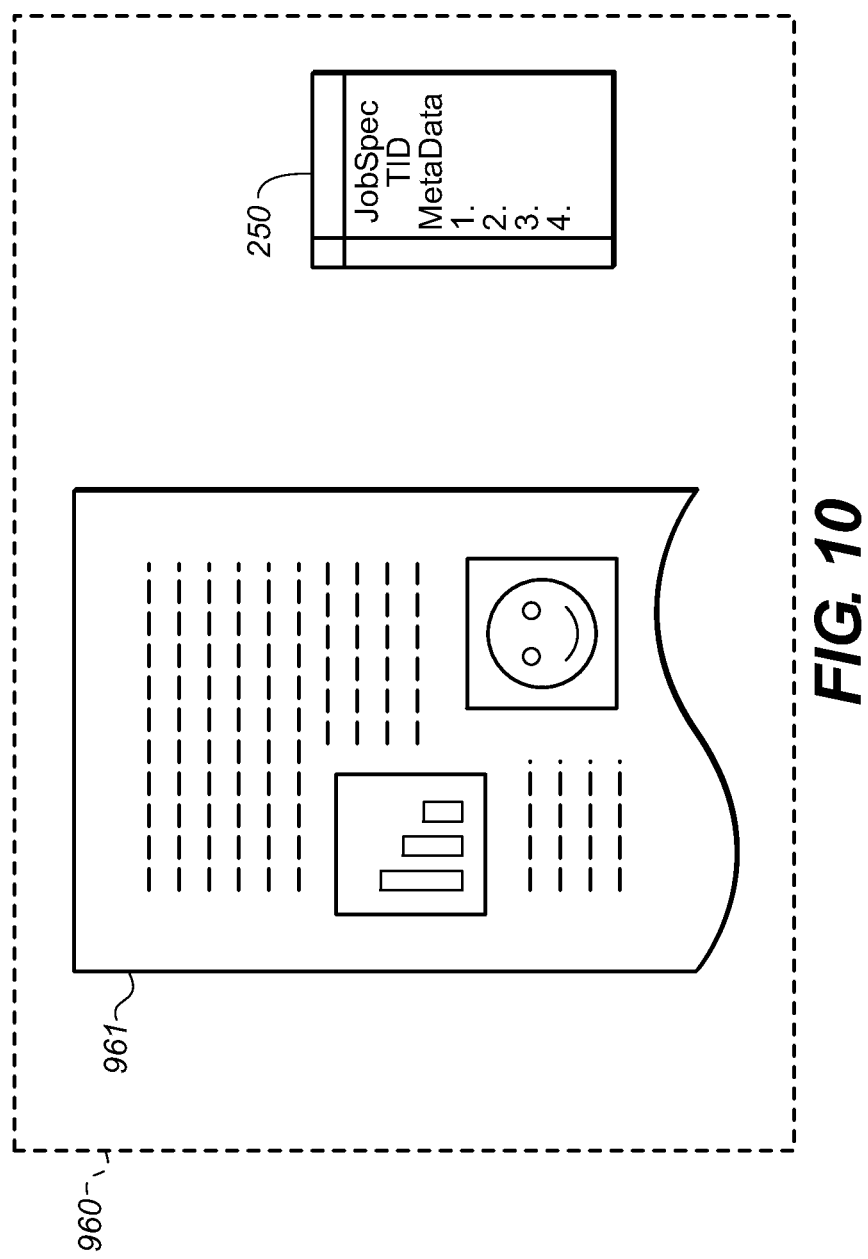
FIG. 10 is a schematic representation of image data and the job specification.

The image data manipulated by image processing 550 is performed using embedded software programs (firmware) stored in firmware memory 525. In some embodiments, the software program is permanently stored in firmware memory 525 using a read only memory (ROM). In other embodiments, the firmware memory 525 can be modifiable by using, for example, Flash EPROM memory. In such embodiments, an external device can update the software programs stored in firmware memory 525. In some embodiments, the image processing 550 includes a program memory (not shown), wherein the software programs stored in the firmware memory 525 are copied into the program memory before being executed by image processing 550. Image processing 550 starts processing image data stored in the capture buffer within the capture controller 520 by extracting the job specification 250 along with the image data capture image 961 present within the capture job 960 (FIG. 10). The image processing 550 then processes the image data from the capture controller 520 according to the job specification 250 using the working image memory 530 as it processes the image data specified within the capture job 960. System controller 541 tracks each incoming capture job as it is dispatched by capture controller 520 and as output by output controller 560 to monitor which processors in processing section 550 are ready to receive a next capture job. The system controller 541 can also be connected to image processing via each individual processor for detailed processor control, for example, monitoring a status of each processor and capture job task until each capture job is completed. The processed images 990 along with completed job specification 992 (FIG. 13) are then stored in output buffer of the output controller 560 until the output interface 570 is ready to accept the processed images representing output job 990 for output. It is understood that the capture controller 520 and output controller 560 can be of any form known to those skilled in the art including, but not limited to, microprocessor, microcontroller, FPGA, and DSP. In addition the buffer memory associated with the controller can be internal or external memory of any form known to those skilled in the art including, but not limited to, SRAM, DRAM, or Flash memory.

Figure 6A:
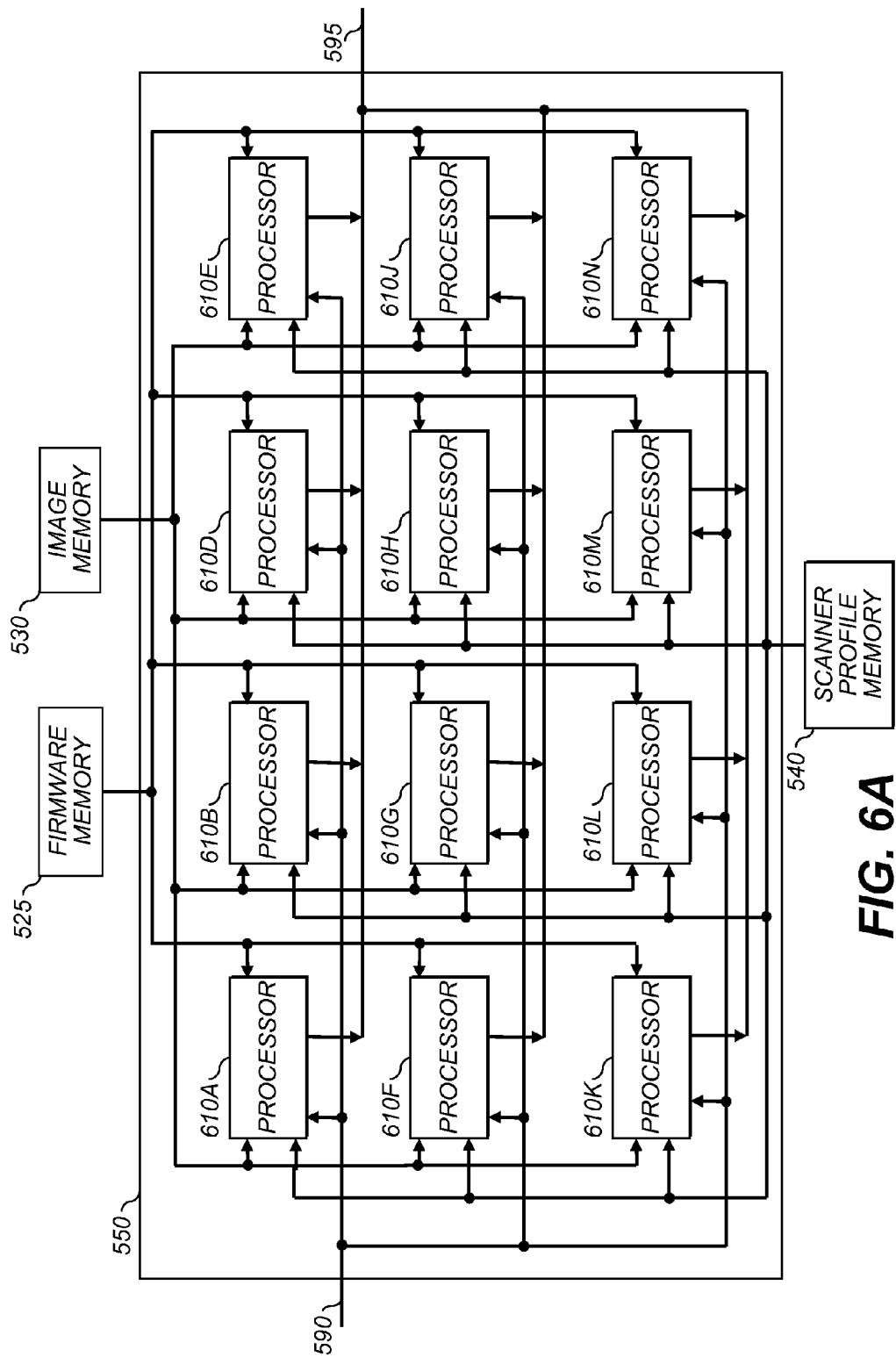
FIGS. 6A-B are block diagrams depicting alternative embodiments of the image processing block of the invention.
Figure 7:
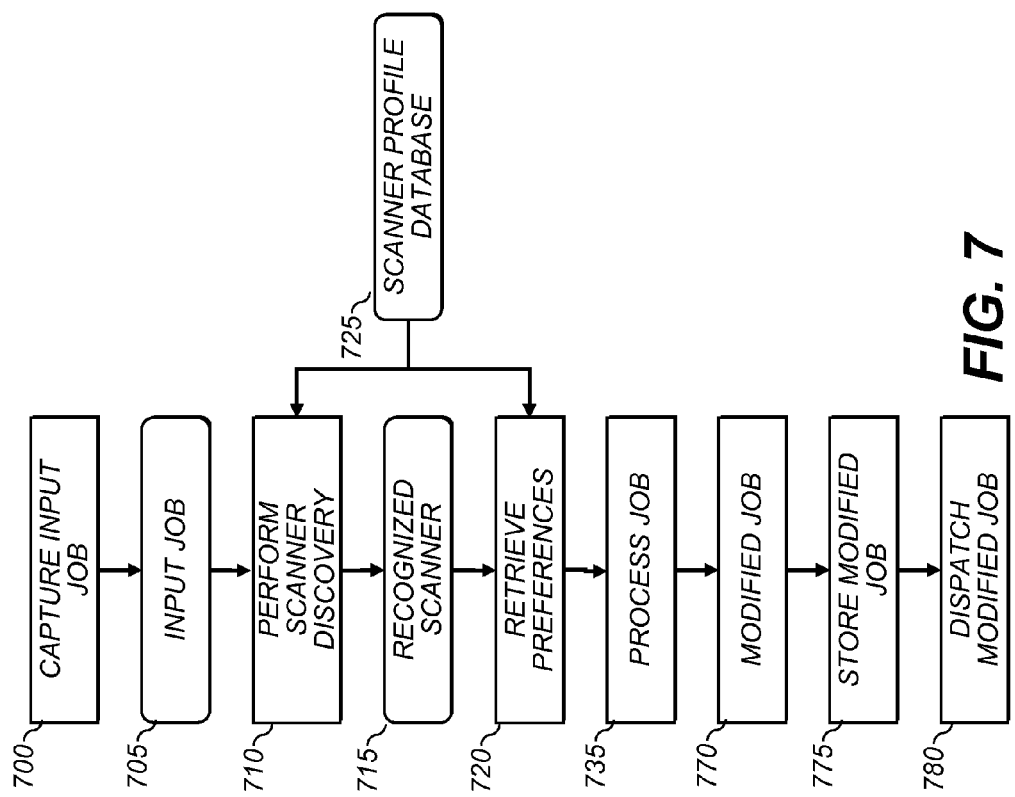
FIG. 7 is a flow diagram depicting the operation of a document scanning and processing system.

In a preferred embodiment of the present invention, FIG. 6A depicts an arrangement of processors 610A-610N in a directly accessible topology, wherein input document images can be assigned directly to any one of the processors. Here each processor (610A-610N) can be dispatched a capture job 960 (FIG. 10) directly by the capture controller 520 (FIG. 5) for processing. The processing being requested for capture job 960 is specified within the job specification 250 generated by controller 230 (FIG. 4) and recognized scanner 715 (FIG. 7). The processors 610A-610N can be all identical processors or they can be a collection of different specialized processors, and any combination of general processors or specialized processors. It is possible that a simple capture job can be processed and completed by one processor, for example processor 610A, and directly output at 595. Other capture jobs might require processing by several processors or by all processors, depending on the combination of processor types employed. If all the processors are identical, each processor 610A, 610B, 610C . . . 610N is capable of performing all processing steps being requested within a given capture job 960 as specified by job specification 250. One or more finished digital images is produced during the modified job step 770 (FIG. 7), processed by system 550 as directed by job specification 250 is output to the output controller 560 (FIG. 5) after the capture job is completed.

Figure 6B:
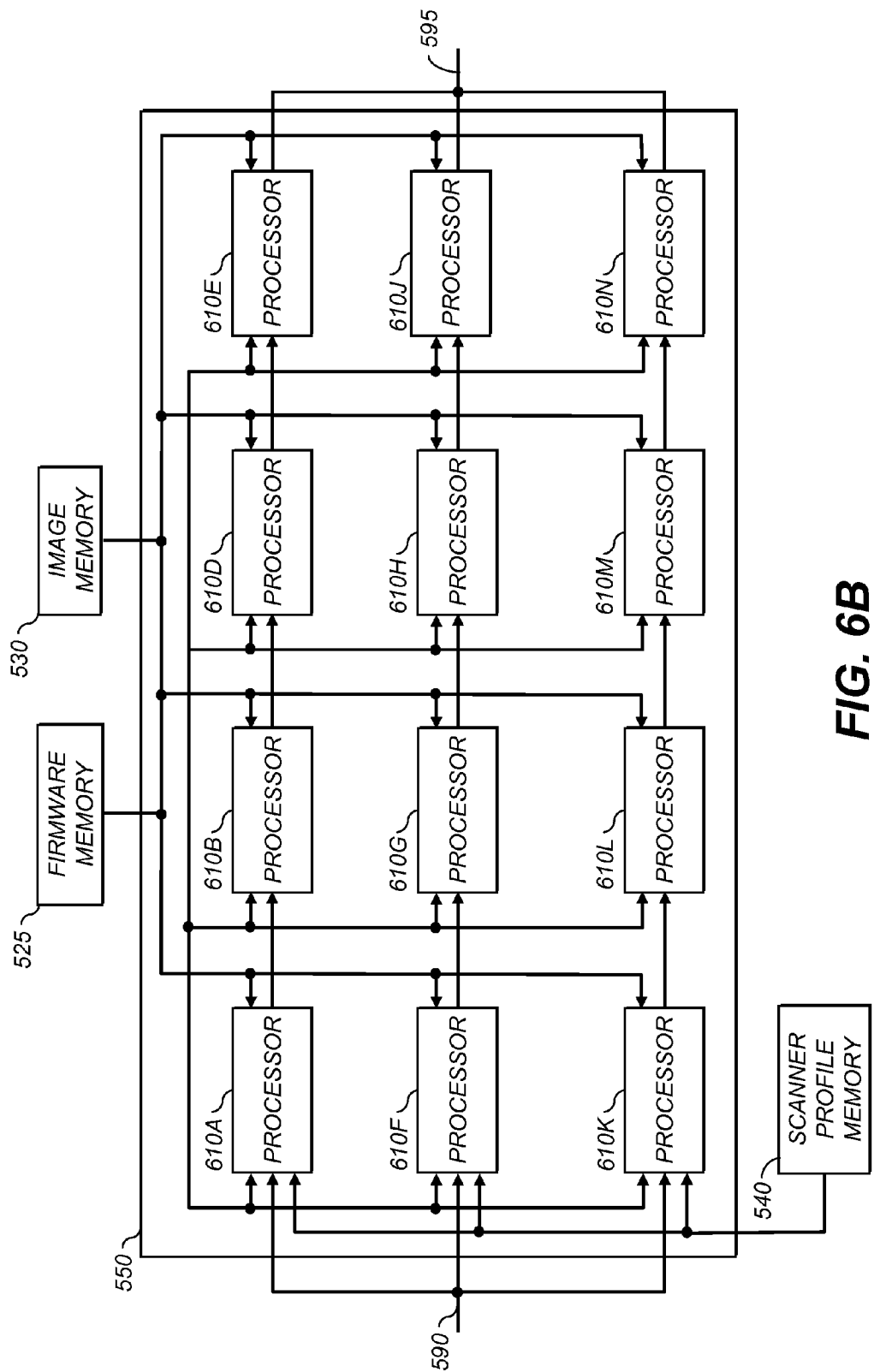

FIG. 6B depicts an alternative embodiment of processors 610A-610N in a cascaded topology implementation of processing system 550. Here the capture controller 520 can only dispatch a capture job 960 (FIG. 10) to 610A, 610F or 610K. The processing being requested for capture job 960 is specified within the job specification 250 generated by controller 230 (FIG. 4) and recognized scanner 715 (FIG. 7). Each processor 610A, 610F, or 610K will perform a predetermined set of processing, update the job specification 250 followed by cascading the modified job 770 (FIG. 7) to processor 610B, 610G, or 610L respectively. As an example, even though processors 610A, 610F or 610K may be capable of performing a particular task in a job specification (such as JPEG compression), processors 610B, 610G, and 610L, may be specialized for performing the task more efficiently, and so processors 610A, 610F or 610K will be programmed to hand off the capture job to speed overall job handling. Further predetermined processing steps prescribed by job specification 250 takes place on processor 610B, 610G and 610L followed by updating job specification 250 to create, for example, analysis completed job specification 972 and cascading the modified job 770, as represented by the analysis capture job 970, to processor 610D, 610H, or 610M respectively. This predetermined processing of capture job 960 by referencing and further updating job specification 250 followed by outputting the modified job 770 from processor 610D to 610E, from processor 610H to 610J, and from processor 610M to 610N continues. The cascaded and updating of the original capture job 960 with job specification 250 is then further processed and completed by the last processor 610E, 610J, or 610N respectively. Jobs may also be completed before it is seen by the last processor and so any processors further downstream can forward the finished job 990 towards the output 595. The processors 610E, 610J, and 610N as configured in FIG. 6B will be required to complete all remaining processing not yet marked as completed within the job specification 250 since processors 610E, 610J, and 610N do not have processors to forward the job towards. Each processor 610E, 610J, and 610N will complete the processing, update the job specification 250 and output one or more modified jobs 770 as directed by job specification 250 to the output controller 560 (FIG. 5). It should be noted that other arrangements of processors can be configured to take advantage of efficiencies provided by any such other arrangements. For example, each column of processors (e.g. column 1 comprising processors 610A, 610F, and 610K) can be identical processor specialized for a particular processing task, thereby capable of processing images in pre-programmed stages, with one stage per column, which is known as a waterfall arrangement. It will be obvious to one skilled in the art that other embodiments, the connections and arrangement of processor 610A, 610B, 610C . . . 610N could be arranged in different topologies. It is further obvious that the number of processor 610 could be different.

In another embodiment, it may be possible that a multiplicity of image processing units 90 could be utilized and arranged in various topologies whereby the capture job 960 may be operated upon independently or collectively by various processors 610 present within each image processing unit 90. In this embodiment, it may be possible for processors 610E, 610J, and 610N (FIG. 6B) to forward the job to another image processing unit 90.

FIG. 7 is a flowchart of a method for providing customized image processing for a plurality of document scanners. Both prior art scanners (FIG. 2B) as well as enhanced scanners (FIG. 3A) provide a capture job 960 as generated from FIG. 4. A digital image of a document is captured as an input job at step 700, which may originate from any one of several document scanners. This step is commonly initiated by a user operating the document scanner. However, any method known in the art can be used to initiate the capture input job step. The input digital image can alternately be a digital photo of a document captured by, for example, a camera or a hand held smart devices and transmitted to the image processing unit 90. The input job is then stored at step 705. The input job may be from a prior art scanner (FIG. 2B) with no job specification 250, or from a scanner source providing a capture job 960 complete with job specification 250. A perform scanner discovery step 710 is used to automatically analyze the input job 705 to identify the source of the digital data. If the input job 705 contains a job specification 250 then that information is used to access the scanner profile database 725 to locate the scanner information. The perform scanner discovery step 710 can use any scanner recognition method known in the art. In a preferred embodiment of the present invention, the scanner discovery method uses a scanner recognition algorithm to compare the scanner ID parameters 220 in the job specification 250 with the scanner parameters for a set of reference scanners that are contained in the scanner profile database 725. If the scanner ID parameters 220 are not found then the scanner characteristics of the scanner can be stored as scanner recognition data in scanner profile database 725. Examples of methods that can be used by a scanner recognition algorithm in accordance with the present invention would include automatically retrieving manufacture, model, and physical scanner location from communications transmitted by the scanner or from within the job specification 250 of this embodiment. In the case where the input job 705 does not contain a job specification 250, a default scanner profile from the scanner profile database 725 is assigned to the input job 705.

In recognized scanner step 715, the job specification 250 within the input job 705 may be updated with additional tasks based on the preferences found associated with the scanner located in the scanner profile database 725. Preferably, metadata providing additional information on the identity of any recognized scanner is added to the job specification for the job. This metadata is useful for a wide variety of different applications, such as image organization and searching.

In other embodiments, the scanner recognition algorithm can use other features of the job specification 250 that are characteristic of the scanner operator instead of the scanner ID parameters 220, during the process of determining the scanner identity at step 715. In this example the user parameters as entered as user control 240 (FIG. 4) can be used. In yet another embodiment, the digital image stored as part of the input job 705 can be automatically analyzed as part of the perform scanner discovery step 710 to extract out identifying characteristics, such as, document type. In this example, documents of a certain type, such as billing invoices, may require processing in a similar manner.

In a preferred embodiment, the scanner discovery step 710 is performed in the image processing unit 90 using the image processing block 550 (FIG. 5). In some embodiments, a special training process can be initiated which instructs the user to scan a document and then prompts the user to enter associated information such as the scanner ID and various user-specific preferences. In other embodiments, the user control of the document scanner 25 can enable the user to select a document scanner from the scanner profile database 725 and designate that the document scanner's profile should be applied to said document scanner 25. In some embodiments, any time perform scanner discovery step 710 detects the presence of a new scanner source that does not correspond to any of the reference scanners in the scanner profile database 725, the user can be presented with the opportunity to add that scanner as a new entry in the scanner profile database 725.

After the perform scanner discovery step 710 has identified the scanner source at step 715, a retrieve preferences step 720 is performed to retrieve scanner-specific preferences from the scanner profile database 725. The preferences can include one or more of the preference types discussed below with respect to FIG. 9. After the preferences have been retrieved, the job specification 250 created in FIG. 4 may be updated based on the additional preferences retrieved in step 720. The process job step 735 is used to process the input digital image according to the updated job specification to produce a modified job at step 770. In some embodiments, multiple modified digital images may be produced corresponding to multiple streams as defined by the image stream preferences defined in the scanner profile database 725. In some embodiments, the process job step 735 can also produce a version of the modified job according to the preferences of the scanner operator in addition to the version that is produced according to the preferences of the recognized scanner. Thus, the scanner profile database 725 can include processing preferences that may request multiple modified digital images be generated based on scanner ID, scanner type, scanner location, user preferences, or image content.

In a preferred embodiment of the present invention, the process job step 735 processes the input digital image according to one or more of the user settings input at step 240 of FIG. 4, and the image adjustment preferences specified in the scanner profile database 725 and retrieved at step 720. Various settings associated with the functions such as image compression may also be adjusted according to image format preferences specified in the scanner profile database 725. In a certain embodiment, it may be possible to have user settings can be programmed to override stored system preferences or default processing by, for example, assigning a simple priority to settings with each preference setting.

Step 775 is used to store the modified job which consists of the capture image 961, the updated job specification and any requested digital image. The modified job is dispatched in step 780 to the next available processor 610.

Figure 8:
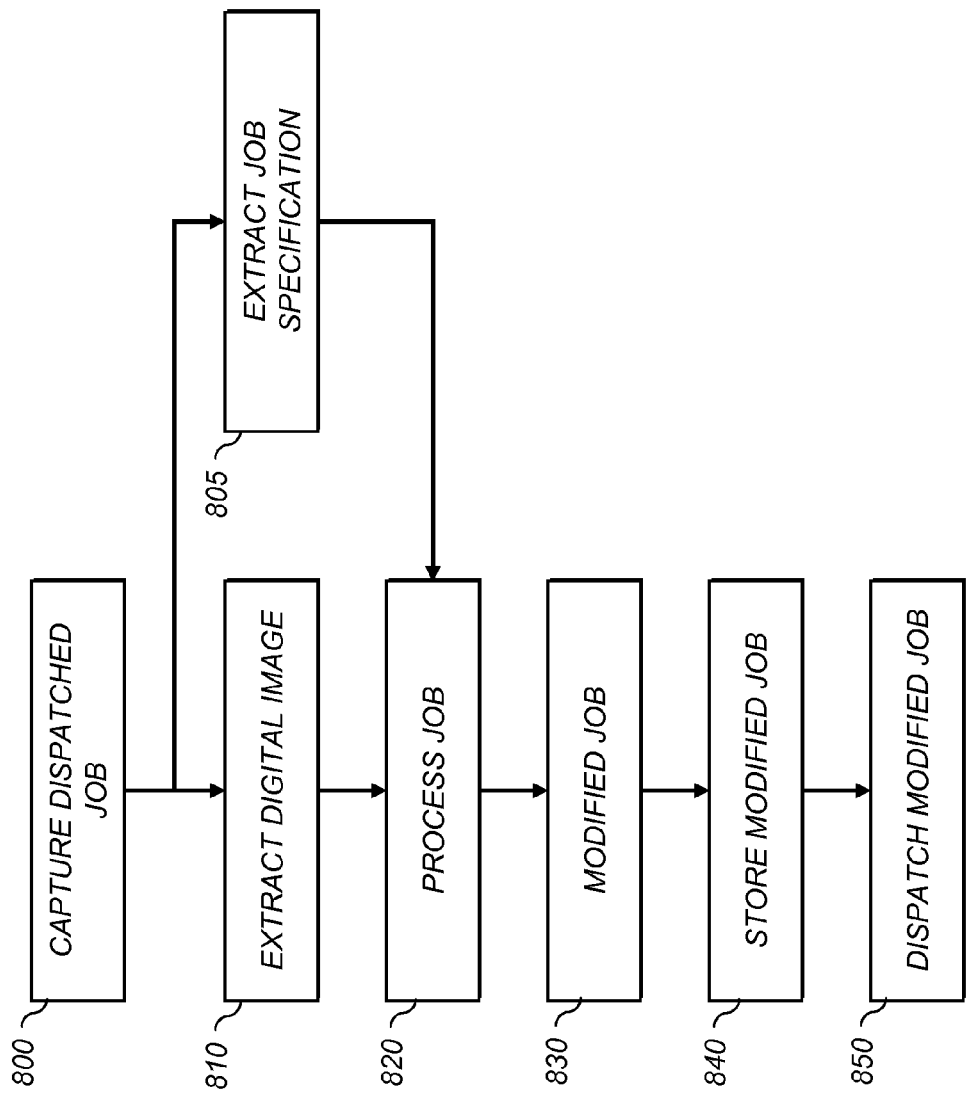
FIG. 8 is a flow diagram depicting an alternative operation of a document scanning and processing system.

FIG. 8 is a flow diagram depicting an alternative operation of a document scanning and processing system. FIG. 8 represents the case where a processor, for example 610A dispatches the modified job 780 (FIG. 7) to another processor, such as 610B. The receiving processor receives capture dispatched job at step 800 and extracts the input digital image at step 810 and job specification at step 805. A scanner discovery step is not required in FIG. 8 because the scanner was already recognized from step 710 in FIG. 7. Processing of the input digital image continues according to the job specification in the process job at step 820 to produce modified job at step 830. At this point any digital images created from the process job 820 can be saved in the store modified job step 840. If additional processing is required, the modified job can be passed to yet another processor, such as 610D in the dispatch modified job at step 850.

FIG. 9 illustrates an example of the types of information that can be stored in the scanner profile database 725 in accordance with preferred embodiments of the present invention. In this example; the scanner profile database 725 contains profiles for three different scanners. The scanner #1 profile 900 contains information pertaining to a first scanner, scanner_x; the scanner #2 profile 905 contains information pertaining to a second scanner, scanner_y; and the scanner #3 profile 910 contains information pertaining to a third scanner, scanner_z. The use of scanner profiles is adapted from the user profiles for specifying person-specific preferences as described in commonly assigned, Published U.S. Patent Application No. 2011-0270947 A1, entitled "Digital Imaging Method Employing User Personalization and Image Utilization Profiles" which is incorporated herein by reference in its entirety.

The profile for each of the scanners includes text strings identifying the scanner's ID. The profile for each of the scanners also includes scanner recognition data that is adapted to be used by the perform scanner discovery step 710. The scanner recognition data corresponds to the characteristic data used by the scanner recognition algorithm to compare a detected scanner with the reference in the scanner profile database 725. In a preferred embodiment, the scanner recognition data includes a plurality of scanner parameters such as manufacture, model, maximum camera capture resolution, and pixel bit depth. The scanner recognition data can also include other parameters that can be useful in identifying a scanner such as location and user.

The profile for each of the scanners also includes various preferences, such as image adjustment preferences, image product preferences, and image format. Image adjustment preferences can include generic preferences for a scanner in the way the captured input digital image is processed using various image processing steps such as under user control as shown in FIG. 4. The image processing settings can also include any type of image processing setting known in the art. For example, the image processing settings can include segmentation, deskewing, color correction, blank page removal, rotation, color dropout, binarization, compression or sharpening algorithms. These processing settings are stored within the job specification 250 as part of the capture job 960 (FIG. 10).

Image stream preferences can provide an indication of how many different streams or images should be created from the captured input digital image. For example, a car insurance form may consist of information from an insurance agent and an attached photograph of a car. In this example, two different images are required (a bitonal image and a color image). The bitonal image could be used for retrieving the information on the form, such as text information, or it can be used for additional processing by an OCR engine. The color image is used to document the condition of the car.

Image format preferences can provide an indication of the file format and compression type requested for a corresponding scanner. Using the a car insurance form above as an example, the image format preferences would define that the bitonal image should be formatted as a TIFF file format while the color image is compressed as a JPEG file format. The image format preferences could also define the level of compression. For example, for JPEG compressed images, the quality factor used for compression could be defined or the maximum file size could be defined to determine the amount of compression applied to the color image. The storage preference defines where the images are sent by the output interface 570 of FIG. 5. Continuing with the car insurance form example, the TIFF image is sent to the insurance database on the network while the JPEG is sent to the accident claim department for review.

FIG. 10 represents a schematic representation of the output being generated by the method shown in FIG. 4, namely, a capture job 960. The capture job 960 consists of a capture image 961 of the input document and the job specification 250. This job specification 250 contains various metadata defining the origination of the captured image 961, scanner profile specifics selected from the scanner profile database 725 shown in FIG. 9 along with the desired list of processing and output images being requested and processing specified by user control 240. The scanner profile is requested based on a scanner ID which is obtained by the methods described above. As the name job specification implies, this is the complete task list being requested by the scanner as configured by the scanner operator by inputting preferences via user control 240, and/or as input automatically by the scanner system, and/or as provided by lookup in the scanner profile database 725 shown in FIG. 9. At the output interface 210 the job specification 250 contains all necessary metadata required to process the capture job 960. At the scanner output interface 210 the job specification 250 is an unfulfilled list of processing tasks being requested for processing on the current capture image 961. If the scanner is capable of performing some of the processing tasks, it may mark them as completed. Thus, before the job is output, the scanner reads the job specification to complete whichever tasks it is capable of completing. The capture job 960 as received by the capture controller 520 performs the steps depicted within FIGS. 7 & 8 and processed within image processing 550 using various processor topologies FIGS. 6A and 6B. As the capture job 960 is processed the corresponding job specification 250 is updated with processing metadata reflecting the completed analysis processing as requested within the job specification 250. This example modified job specification 972 can be seen within FIG. 11 as a conceptual schematic of the modified capture job 970 in that some of the processing steps namely 1 & 2 have been marked as DONE and are completed.

Figure 11:
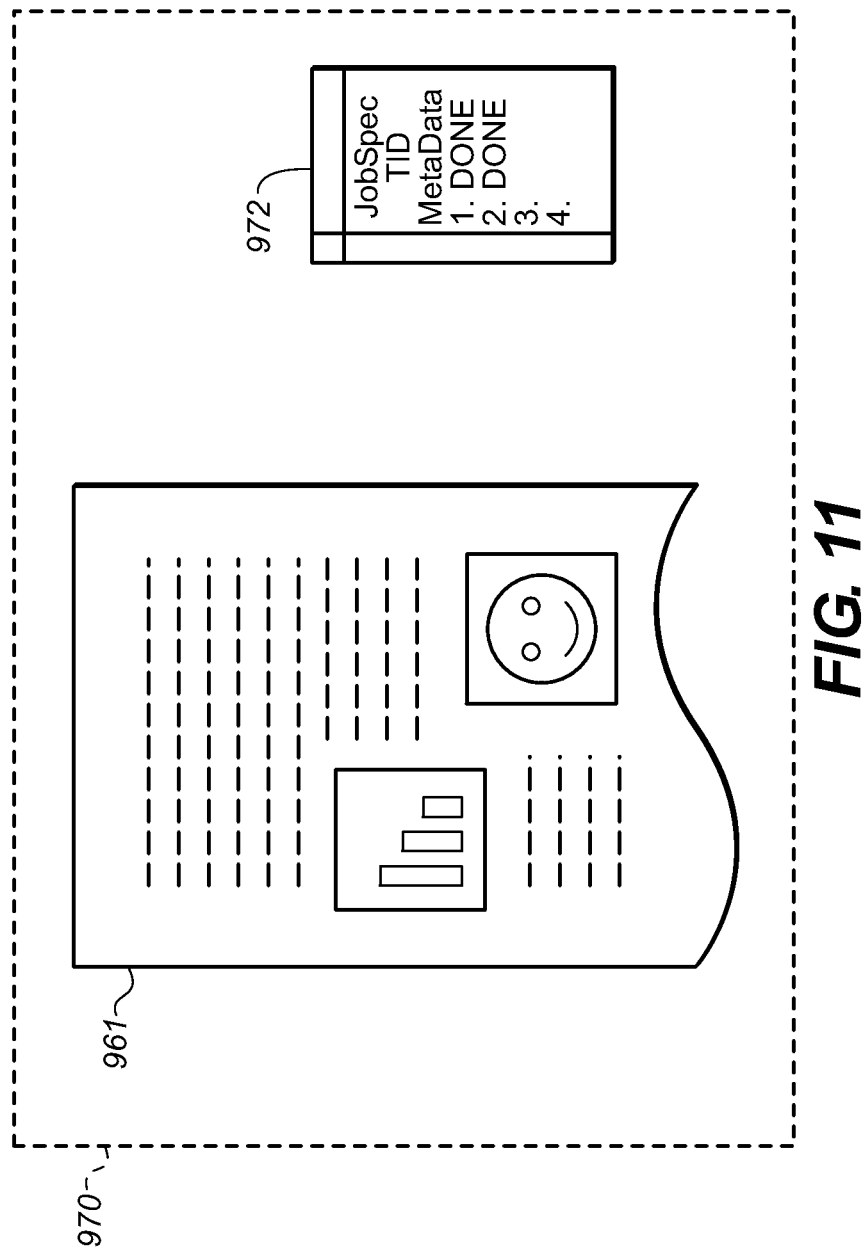
FIG. 11 is a schematic representation of a capture job with job specification showing analysis completed.

FIG. 11 shows a modified capture job 970 which is in the modified state. In other words, the modified job specification 972 has had one or more processing steps completed. This FIG. 11 represents a schematic of the modified capture job 970 at the dispatch modified job step 780 in FIG. 7 or step 850 within FIG. 8. This representation of the modified capture job 970 is only one of many snapshots of the modified capture job 970 as the capture job 960 is processed.

Figure 12:
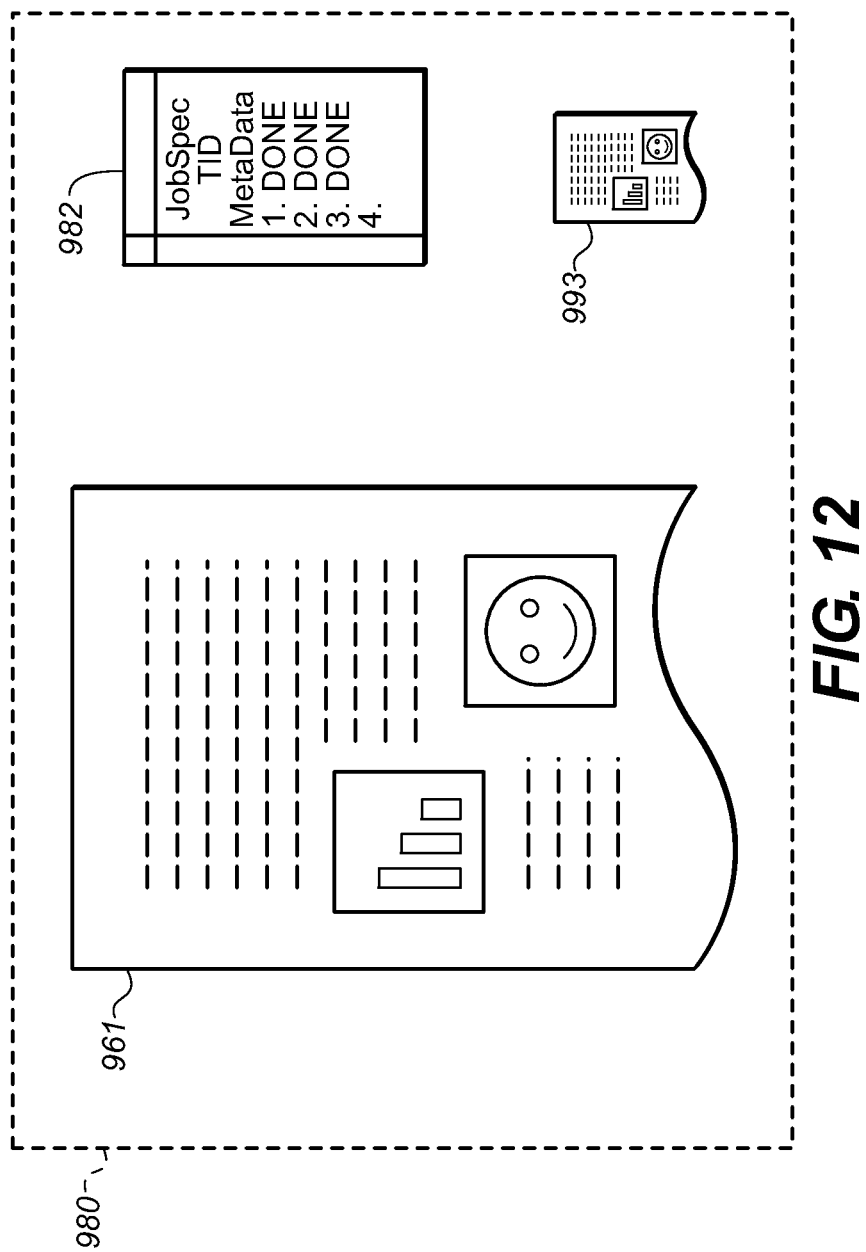
FIG. 12 is a schematic representation of a capture job with job specification showing the analysis completed and low-resolution image.

FIG. 12 is a schematic of yet another snapshot of the modified capture job 960 wherein at this stage of progress all analysis processing steps 1 & 2 have been completed and recorded as DONE within the modified and updated job specification 982 along with the generation of a low-resolution color image 993 being created (requested step 3) and recorded as DONE within the same modified and updated job specification 982. It will be appreciated that even one or more of the images appearing within FIG. 12 may be present in another snapshot of a modified capture job 980 before the capture job 960 is processed on its way to becoming becomes the finished job 990.

It will be understood and appreciated that there will be numerous such snapshots wherein the amount of processing done will be different as the capture job 960 is collectively processed on processors 610 (FIGS. 6A & 6B). As such there will exist a plurality of snapshots whereby additional analysis processing steps have been completed and updated within the modified and updated job specification 982 as well as other snapshots containing additional output images as shown in the finished job 990 (FIG. 13).

The job specification 250 generated at the create job specification 250 step FIG. 4 is shown as a schematic representation of a data structure database collection of information. It is understood that there are numerous data structure mechanisms that maybe utilized to organize and embody the user preferences, scanner ID parameters 220 and metadata 225. It is further appreciated that this job specification 250 is capable of uniquely identifying the capture job 960 which embodies said job specification 250 as output at scanner output interface 210 (FIG. 4). Furthermore, it will be understood that as processing is performed on capture job 960 via processors 610 (FIGS. 6A & 6B) the job specification 250 will maintains and organizes intermediate processing results and tracks images produced in a uniquely identifiable manner. Even though the schematics show the job specification 250 as being a separate entity, it will be appreciated that, as implemented, the job specification 250 will be associable with the captured digital image 268 as output as capture job 960 at scanner output interface 210 as well as be associable with modified capture job 970, 980, etc. as well as uniquely associable with each subordinate image 993, 994, 995, 996, 997 collectively output in intermediate modified capture jobs 970 and 980 as well as the finished job 990. The mechanism of uniquely associating the job specification 250 with the digital image capture 268 or the various output stream images 993-997 could be accomplished by embedding or attaching the job specification 250 with the image itself or maintained separately within the system in a system wide database accessible by all processors 610 and various controllers. The implementation can be accomplished using numerous methods known to those skilled in the art. What is required is that this mechanism supports the overall system's requirement of being able to uniquely identify and track the capture job 960 from a specific and uniquely identifiable scanner or capture device as it progresses throughout the system from scanner output interface 210 to output interface 570.

Figure 13:
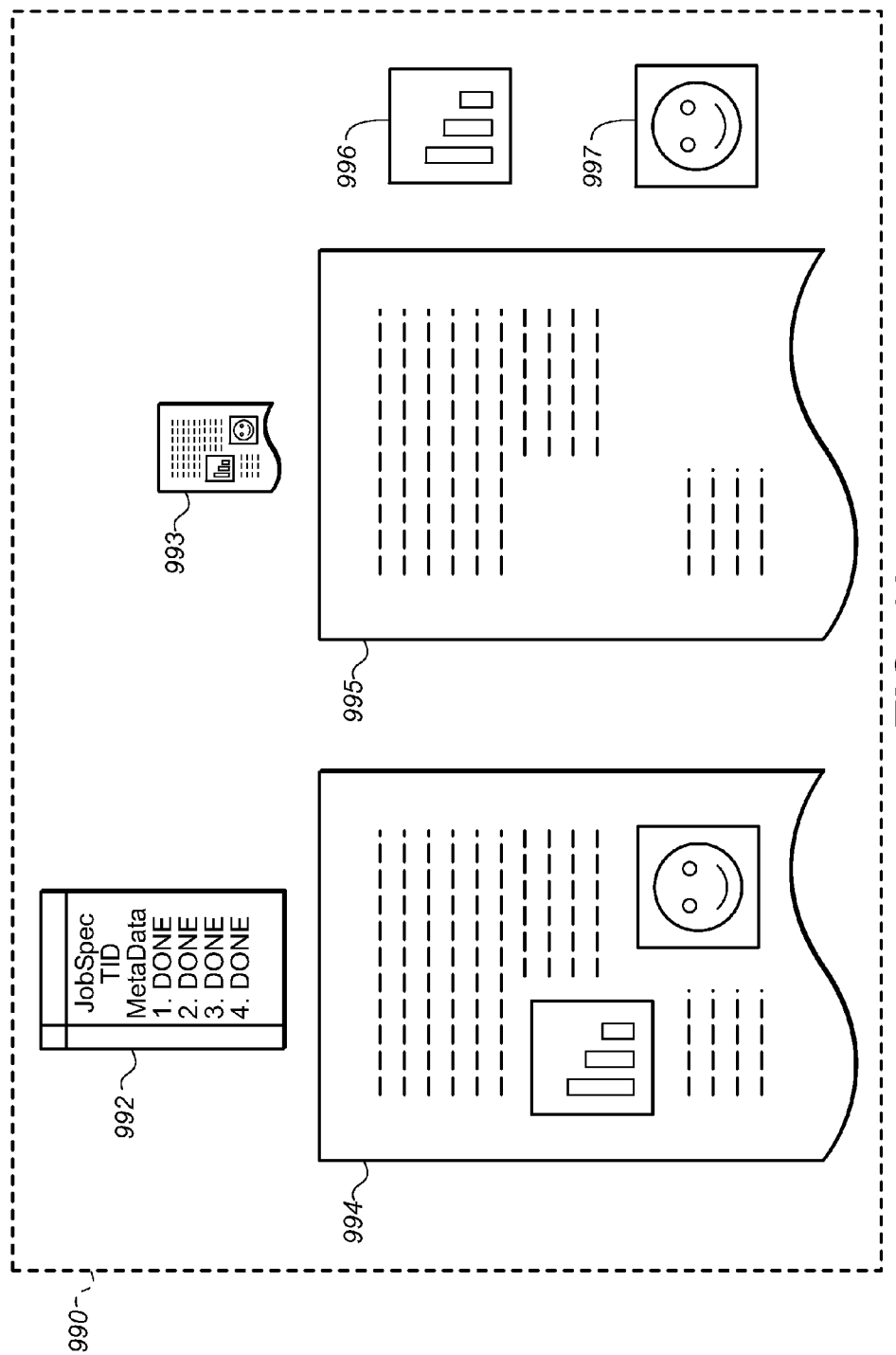
FIG. 13 is a schematic representation of finished image data and the finished job specification.

FIG. 13 is a schematic representation of a finished job 990 corresponding to the original capture job 960, but with all requested processing completed. In this example, the finished job specification 992 along with the output images resulting from the various processing requested within the original job specification 250 is shown. In this example, we have a requested low resolution color image 993 of the original document, high-resolution color image of the original document 994, high-resolution bitonal image 996 which is a graphics gray scale segment extracted from the document, hi-resolution bitonal image 995 containing, for example, text data from the original document to be used, for example, in a downstream OCR process, and photo color segment 997. Each of these stream output images representing the finished job 990 are delivered as output at stored modified job 770 step within FIG. 7 or 840 step within FIG. 8. It is understood that other metadata and processing would produce a different set of finished images from the original capture job 960.

Figure 2A:
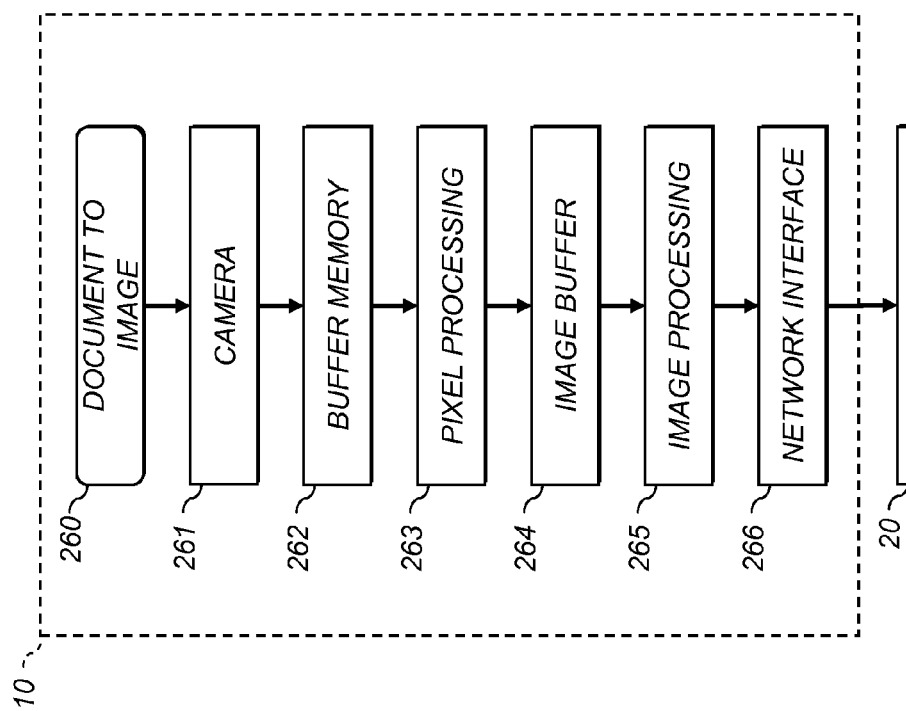
FIG. 2A is a flow diagram of a typical prior art document scanner.
Figure 2B:
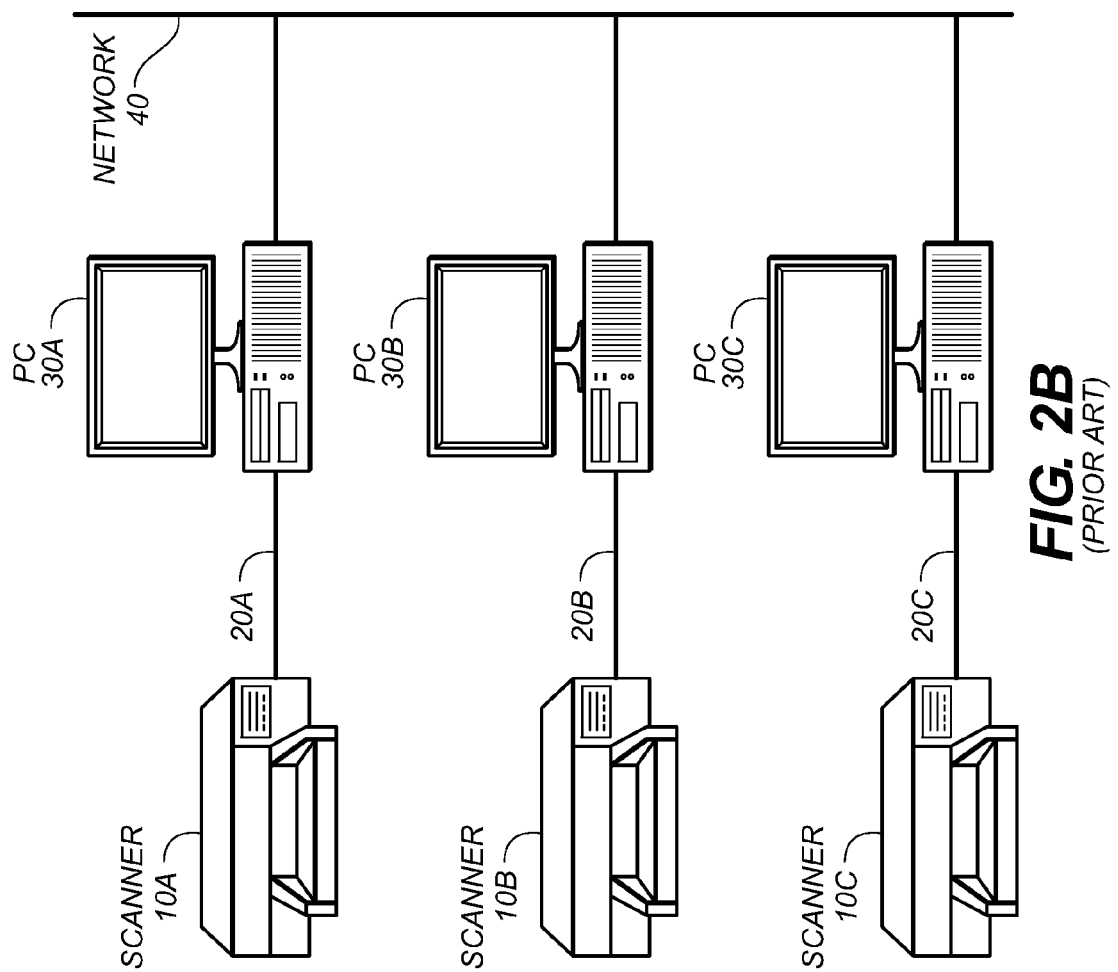
FIG. 2B is a block diagram of multiple scanners connected over a network.
Figure 14B:
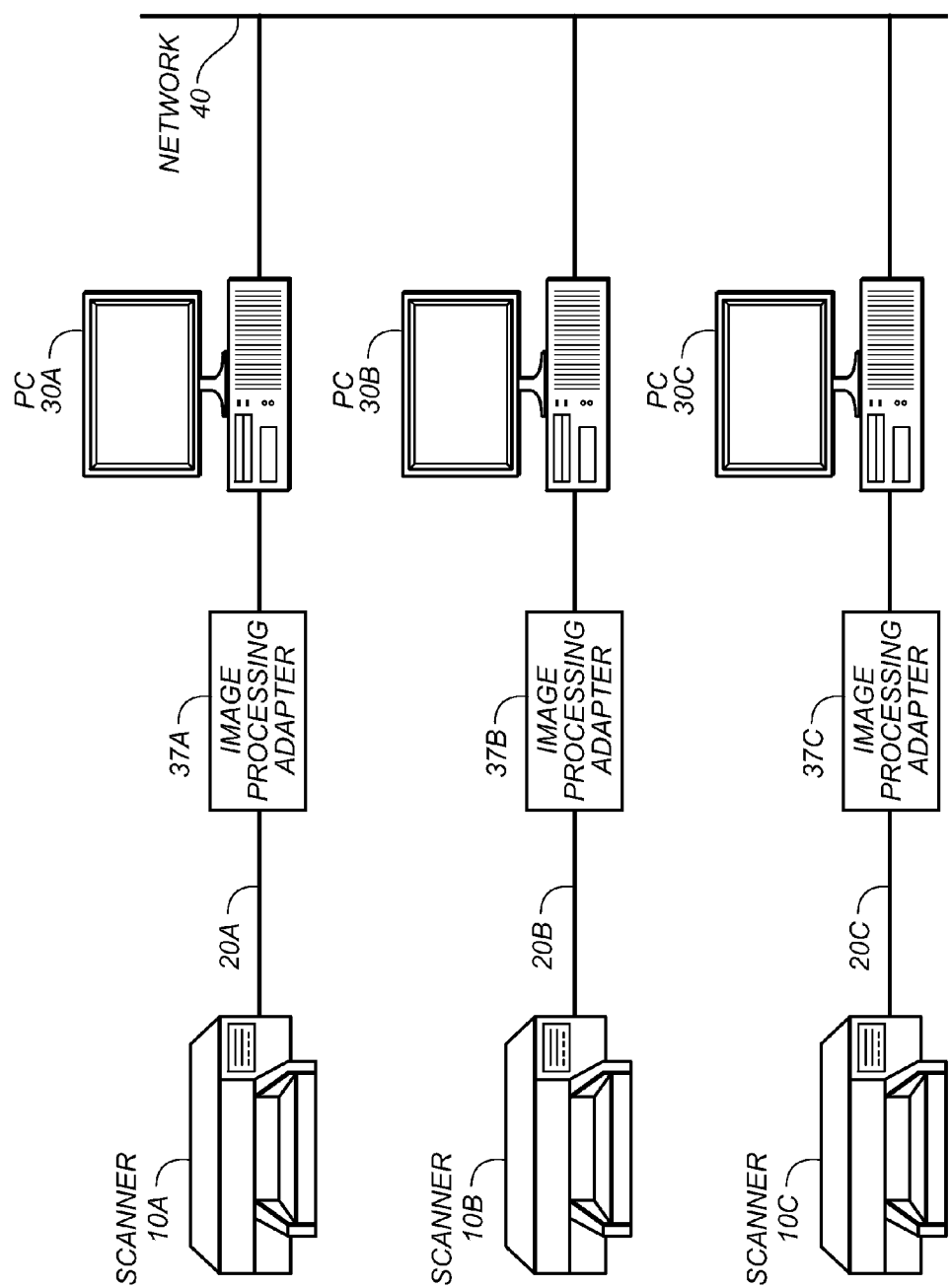
FIG. 14B is a block diagram of network connected scanning systems in accordance with an embodiment of the invention.

With reference to FIGS. 14A-B, there are illustrated modifications to a system such as exemplified in FIG. 2B according to preferred embodiments of the present invention. The three previously described document scanners 10A, 10B, and 10C are connected over three different interfaces 20A, 20B, and 20C to three network connected Image Processing Adapters, 37A, 37B, and 37C ("IPAs"). In another preferred embodiment, as illustrated in FIG. 14B, personal computers 30A, 30B, and 30C are connected to the IPAs for storing and providing images processed by the IPAs over a network 40.

There are cases where scanner users have prior art scanners as shown in FIG. 2B connected to old and/or underpowered PCs. To improve the scanning process in this environment, the scanner user would typically be forced to upgrade either the scanner or the PC. In the illustrated alternate preferred embodiment, it is possible to scale down the image processing units 90 to complement a single scanner, as illustrated, and still improve the scanner performance. In this embodiment, the image processing units 90 are modified into IPAs 37A-C that replace the PC 30 as shown in FIG. 14A. In another alternative preferred embodiment, the PC remains, as illustrated in FIG. 14B, but the image processing is moved into the connected IPA. Processed images can be managed at the PC. In this configuration the image processing adapters 37A-C provide the extra processing power required for the scanning process while maintaining the existing connection between the prior art scanners 10 and the network 40. In the alternative configuration of FIG. 14B, the image processing adapters could be inserted in between the PCs 30A-C and the prior art scanners 10A-C, respectively, thereby removing the scanner image processing functions from the PC and allowing it to be used for other PC applications. The PC could be reached over the network 40 instead of directly connected to the IPA, to receive output from one or more of the IPAs. Output from IPA adapter could be directed to a network server, such as a repository server. Although FIGS. 14A-B illustrate IPAs connected to scanners, the systems can be mixed, such as an Image Processing Unit 90, as described above, connected to a scanner together with other scanners that each operate via an IPA. Scanners that do not conform to any particular standard can operate with the IPA of this embodiment. The outputs of the IPAs would be known (standardized) regardless of the inputs. The IPA is designed to handle throughput from scanners 10 in whatever form it is received.

Figure 15:
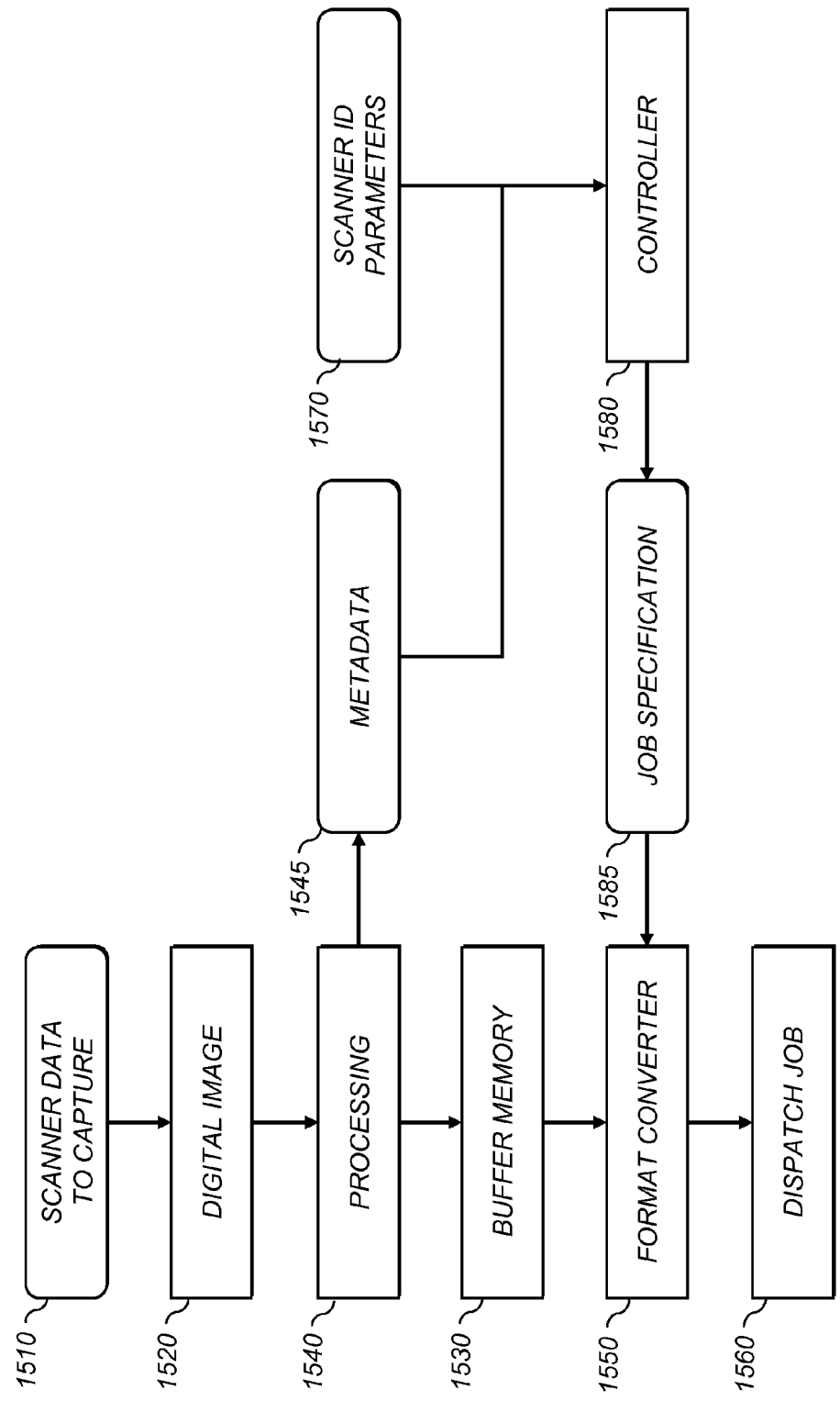
FIG. 15 is a flow diagram depicting a document scanning and processing system in accordance with an embodiment of the invention.

With reference to FIG. 15, scanner data is captured at step 1510 by the image processing adapter 37. The captured scanner data represents the digital image data 1520. The image data 1520 is processed at step 1540 to extract key characteristics from the image that will help further process the image. It is typical of prior art scanners to add a header file to the image data or to perform a limited compression of the image before sending the scanner data to the PC. The processing step 1540 will strip off the header and/or uncompress the image data and store it in the buffer memory at step 1530. Any header information will be used to create the metadata 1545. Controller 1580 reads the scanner ID parameters 1570, and the metadata 1545 to create the job specification 1585 that is sent to format converter 1550. The format converter will combine the processed image data with the job specification to create a capture job which can be dispatched at step 1560. Because of the one-to-one connection between IPA and scanner, several differences in FIG. 15 as compared to FIG. 4 is apparent: User control is rendered unnecessary; Dispatch job step 1560 replaces output interface (although output format is similar); no discovery step to identify the scanner is necessary; preferences are in the job spec already because the source is known. In this preferred embodiment, scanner ID parameters are hardcoded in the IPA.

Figure 16:
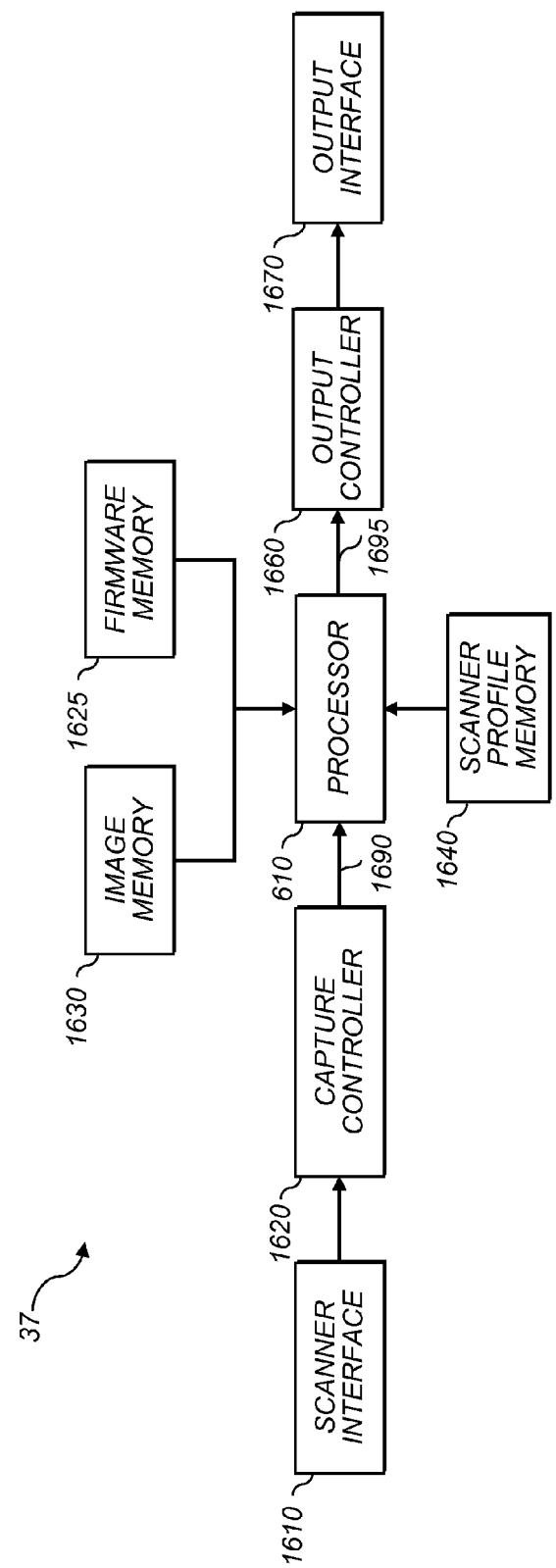
FIG. 16 is a block diagram depicting an image processing system in accordance with an embodiment of the invention.

With reference to FIG. 16 (compare to FIG. 5), there is illustrated a block diagram depicting the IPA. The prior art scanner 10 is connected to the scanner interface 1610 and its output is temporarily stored in capture buffer of the capture controller 1620, where it is subsequently manipulated by processor 610. The scanner profile memory 1640 contains the identification information for the attached scanner. Since there is only one scanner attached, scanner discovery is not required. A system controller is no longer required for the IPA as shown in FIG. 16. The profile memory 1640 would have one entry corresponding to the attached scanner. The processor 610 is designed as one or two processing units. The output controller 1660, output interface 1670, image memory 1630, and firmware memory 1625 operate as in the system depicted in FIG. 5 and as described above.

The invention has been described in detail with particular reference to certain preferred embodiments thereof, but it will be understood that variations and modifications can be effected within the spirit and scope of the invention.

PARTS LIST

10 Scanner
20 scanner interface
25 scanner
30 personal computer (PC)
37 Image Processing Adapter
40 network
90 image processing unit
101 Remote System
102 Remote Control
103 Mouse
104 Keyboard
105 Bus
106 Remote Output
107 Sensors
108 Image Sensor
109 Storage/Memory
110 HDD
111 Drive
112 Removable Device
113 Interface
114 Slot
115 Communication System
116 Processor/CPU System
117 Local Output
118 Mouse
119 Keyboard
121 Devices
125 Housing
142 Scanner/Printer Interface
150 Workstation/PC
151 Control/Editing Area
152 User
159 Storage/Memory
167 Local Output
168 Mouse
169 Keyboard
170 Audio Sensor
171 Image Sensor
172 Sensor System
200 format converter step
210 scanner output interface step
220 scanner id parameters data
225 metadata data
230 controller step
240 user control step
250 job specification data
260 document to capture
261 camera step
262 buffer memory step
263 pixel processing step
264 image buffer step
265 image processing
266 interface network
268 digital image
275 correct image data
510 scanner interface
520 capture controller
525 firmware memory
530 image memory
540 scanner profile memory
541 system controller
550 image processing unit
560 output controller
570 output interface
525 firmware memory
530 image memory
540 scanner profile memory
590 processor capture bus
595 processor output bus
610 processor
700 capture input job step
705 input job
710 perform scanner discovery step
715 recognized scanner step
720 retrieve preferences step
725 scanner profile database
735 process job step
770 modify job step
775 store modified job step 780 dispatch modified job step
800 capture dispatch job step
805 extract job specification step
810 extract digital image step
820 process job step
830 modify job step
840 store modified job step
850 dispatch modified job step
900 scanner #1 preferences
905 scanner #2 preferences
910 scanner #3 preferences
960 capture job
961 capture image
970 capture job
972 job specification with analysis completed
980 capture job
982 job specification with analysis completed and low resolution color image
990 finished job
993 low-resolution color Image
994 high-resolution color image
995 high-resolution bitonal image
996 graphics gray segment
997 photo color segment
1510 scanner output step
1520 digital image
1530 buffer memory step
1540 processing step
1545 metadata
1550 format converter step
1560 dispatch job
1570 scanner ID
1580 controller
1585 job spec
1610 scanner interface
1620 capture controller
1625 firmware memory
1630 image memory
1640 scanner profile memory
1660 output controller
1670 output interface
1690 processor capture bus
1695 processor output bus

The invention claimed is:

1. Method comprising:
receiving digital image data from a plurality of digital image sources, the digital image data comprising a plurality of digital images and source identifiers, each of the source identifiers corresponding to one of the plurality of digital images;
providing a plurality of processors for simultaneously processing the received digital images according to stored processing instructions, each processor corresponding to one of the plurality of digital images, wherein the different ones of the processors are specialized for executing particular ones of the stored processing instructions;
using the source identifier to access a table of image sources for determining which of the stored processing instructions correspond to each of the plurality of the received digital images;
processing the plurality of the received digital images, each at a different one of the plurality of processors based on the determined corresponding stored processing instructions, the processors each specialized to execute the stored processing instructions corresponding to one of said plurality of the received digital images; and
sequentially outputting the processed digital images over an output interface connected to the plurality of processors.

2. The method of claim 1 wherein the step of receiving digital image data comprises receiving the digital image data over a network connection from a plurality of digital image sources connected to the network.

3. The method of claim 1 wherein the step of receiving digital image data comprises receiving the digital image data over a plurality of hardware interfaces each connected to one of a plurality of digital image sources.

4. The method of claim 1, further comprising using a subset of the plurality of processors for processing the digital image data in response to receiving the source identifiers.

5. The method of claim 1, further comprising using only a first one of the processors for processing one of the digital images in the digital image data in response to a source identifier corresponding to the one of the digital images and using only a second one of the processors for processing another one of the digital images in the digital image data in response to a source identifier corresponding to said another one of the digital images.

6. Method comprising:
receiving digital image data from a plurality of digital image sources, the digital image data comprising a plurality of digital images;
using the digital image data to determine a source and a source identifier for each of the plurality of digital images;
using the source identifier to access a table of processing preferences to determine processing preferences for each of the plurality of digital images in the digital image data;
providing a plurality of processors for simultaneously processing the received digital images according to stored processing procedures each corresponding to one of the received digital images, the processing procedures for each of the digital images being optimized on different ones of the processors;
simultaneously processing each of the received digital images according to their corresponding processing procedures on said different ones of the processors; and
sequentially outputting the processed digital images over an output interface connected to the plurality of processors.

7. Method according to claim 6, wherein the step of determining the processing preferences comprises determining a content of each of the plurality of digital images in the digital image data.

8. The method of claim 6, wherein the step of receiving digital image data comprises receiving the digital image data over a network connection from a plurality of digital image sources connected to the network.

9. The method of claim 6, wherein the step of receiving digital image data comprises receiving the digital image data over a plurality of hardware interfaces each connected to one of a plurality of digital image sources.

10. The method of claim 6, wherein the step of simultaneously processing each of the received digital images comprises simultaneously processing again each of the received digital images according to their corresponding processing procedures on other ones of the processors that are separate from said different ones of the processors before the step of sequentially outputting the processed digital images.

11. Method comprising:

receiving digital image data from a plurality of digital image sources, the digital image data comprising a plurality of digital images;

using the digital image data to determine a user name for each of the plurality of digital images;

using the user name to access a table of processing preferences to determine processing preferences for each of the plurality of digital images in the digital image data;

providing a plurality of processors for simultaneously processing the received digital images according to stored processing procedures each corresponding to one of the received digital images, the processing procedures for each of the digital images being optimized on different ones of the processors;

simultaneously processing each of the received digital images according to their corresponding processing procedures on said different ones of the processors; and sequentially outputting the processed digital images over an output interface connected to the plurality of processors.

12. The method according to claim 11, wherein the step of determining the processing preferences comprises determining a content of each of the plurality of digital images in the digital image data.

13. The method of claim 11, wherein the step of receiving digital image data comprises receiving the digital image data over a network connection from a plurality of digital image sources connected to the network.

14. The method of claim 11, wherein the step of receiving digital image data comprises receiving the digital image data over a plurality of hardware interfaces each connected to one of a plurality of digital image sources.

15. The method of claim 11, wherein the step of simultaneously processing each of the received digital images comprises simultaneously processing again each of the received digital images according to their corresponding processing procedures on other ones of the processors that are separate from said different ones of the processors before the step of sequentially outputting the processed digital images.

* * * * *